United States Patent
Linsky et al.

(10) Patent No.: US 12,349,089 B2
(45) Date of Patent: Jul. 1, 2025

(54) SYNCHRONIZATION MESSAGES FOR PERIPHERAL DEVICES

(71) Applicant: QUALCOMM Incorporated, San Diego, CA (US)

(72) Inventors: Joel Linsky, San Diego, CA (US); Mayank Batra, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 18/183,032

(22) Filed: Mar. 13, 2023

(65) Prior Publication Data

US 2024/0147392 A1     May 2, 2024

Related U.S. Application Data

(60) Provisional application No. 63/381,378, filed on Oct. 28, 2022.

(51) Int. Cl.
*H04W 56/00* (2009.01)
*H04W 24/08* (2009.01)

(52) U.S. Cl.
CPC ....... *H04W 56/0015* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 10,172,169 B2* | 1/2019 | Lee | H04W 4/80 |
| 2015/0092642 A1* | 4/2015 | Geboff | H04L 69/329 |
| | | | 370/350 |
| 2020/0015267 A1* | 1/2020 | Yoshimura | H04W 74/002 |
| 2022/0104151 A1* | 3/2022 | Ly-Gagnon | H04W 8/005 |
| 2022/0322253 A1 | 10/2022 | Tsunashima et al. | |

FOREIGN PATENT DOCUMENTS

EP    1363260 B1    2/2009

OTHER PUBLICATIONS

International Search Report and Written Opinion—PCT/US2023/075429—ISA/EPO—Sep. 5, 2024.

\* cited by examiner

*Primary Examiner* — Brian S Roberts
(74) *Attorney, Agent, or Firm* — Harrity & Harrity, LLP

(57) ABSTRACT

Various aspects of the present disclosure generally relate to wireless communication. In some aspects, a central device may transmit a first communication to initiate a first communication event. The central device may transmit a first synchronization message associated with a first peripheral device and a second synchronization message associated with a second peripheral device during a first time resource and a second time resource, respectively, associated with a first communication event. The central device may transmit a second communication to initiate a second communication event. The central device may monitor, during the second communication event, for a first response from the first peripheral device during a third time resource, and for a second response from the second peripheral device during a fourth time resource. Numerous other aspects are described.

30 Claims, 11 Drawing Sheets

SYNCHRONIZATION MESSAGES FOR PERIPHERAL DEVICES

CROSS-REFERENCE TO RELATED APPLICATION

This Patent application claims priority to U.S. Provisional Patent Application No. 63/381,378, filed on Oct. 28, 2022, entitled "SYNCHRONIZATION MESSAGES FOR PERIPHERAL DEVICES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for synchronization messages for peripheral devices.

BACKGROUND

A wireless personal area network (WPAN) is a short-range wireless network typically established by a user to interconnect various personal devices, sensors, and/or appliances located within a certain distance or area of the user. For example, WPANs based on communication protocols such as a Bluetooth® (BT) protocol, a Bluetooth® Low Energy protocol, or a Zigbee® protocol may provide wireless connectivity to peripheral devices within a specific distance (such as 5 meters, 10 meter, 20 meters, 100 meters, etc.) of the user.

Bluetooth is a short-range wireless communication protocol that supports a WPAN between a central device (such as a host device) and at least one peripheral device (such as a client device). Power consumption associated with Bluetooth communications may render Bluetooth impractical in certain applications.

To address the power consumption issue associated with Bluetooth, Bluetooth® Low Energy (BLE) (also referred to herein as WPAN LE) was developed and adopted in various applications in which data transfers are relatively infrequent. Specifically, BLE exploits the infrequent transfer of data by using a low duty cycle operation, and placing one or both the central device and the peripheral device(s) into a sleep mode between data transmissions, thereby conserving power. Example applications that use BLE include battery-operated sensors and actuators in various medical, industrial, consumer, and fitness applications. BLE may also be used to connect devices such as BLE enabled smart phones, tablets, and laptops. While traditional Bluetooth and BLE offer certain advantages, there exists a need for further improvements in Bluetooth and BLE technology. For example, traditional Bluetooth and BLE have limited range, have limited data capacity throughput, and are susceptible to interference from other devices communicating in the same frequency band (such as Wi-Fi communications).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description presented later.

Some aspects described herein relate to a method of wireless communication performed by a central device. The method may include transmitting a first communication to initiate a first communication event. The method may include transmitting a first synchronization message during a first time resource associated with the first communication event, the first time resource associated with a first peripheral device. The method may include transmitting a second synchronization message during a second time resource associated with the first communication event, the second time resource associated with a second peripheral device. The method may include transmitting a second communication to initiate a second communication event. The method may include monitoring for a first response from the first peripheral device during a third time resource associated with the first time resource, the third time resource associated with the second communication event. The method may include monitoring for a second response from the second peripheral device during a fourth time resource associated with the second time resource, the fourth time resource associated with the second communication event.

Some aspects described herein relate to a central device for wireless communication. The central device may include a memory and one or more processors coupled to the memory. The one or more processors may be configured to transmit a first communication to initiate a first communication event. The one or more processors may be configured to transmit a first synchronization message during a first time resource associated with the first communication event, the first time resource associated with a first peripheral device. The one or more processors may be configured to transmit a second synchronization message during a second time resource associated with the first communication event, the second time resource associated with a second peripheral device. The one or more processors may be configured to transmit a second communication to initiate a second communication event. The one or more processors may be configured to monitor for a first response from the first peripheral device during a third time resource associated with the first time resource, the third time resource associated with the second communication event. The one or more processors may be configured to monitor for a second response from the second peripheral device during a fourth time resource associated with the second time resource, the fourth time resource associated with the second communication event.

Some aspects described herein relate to a non-transitory computer-readable medium that stores a set of instructions for wireless communication by a central device. The set of instructions, when executed by one or more processors of the central device, may cause the central device to transmit a first communication to initiate a first communication event. The set of instructions, when executed by one or more processors of the central device, may cause the central device to transmit a first synchronization message during a first time resource associated with the first communication event, the first time resource associated with a first peripheral device. The set of instructions, when executed by one or more processors of the central device, may cause the central device to transmit a second synchronization message during a second time resource associated with the first communication event, the second time resource associated with a second peripheral device. The set of instructions, when executed by one or more processors of the central device, may cause the central device to transmit a second communication to initiate a second communication event. The set of instructions, when executed by one or more processors of the central device, may cause the central device to monitor for a first response from the first peripheral device during a third time resource associated with the first time resource, the third time resource associated with the second communication event. The set of instructions, when executed by one or more processors of the central device, may cause the central device to monitor for a second response from the second peripheral device during a fourth time resource associated with the second time resource, the fourth time resource associated with the second communication event.

Some aspects described herein relate to an apparatus for wireless communication. The apparatus may include means for transmitting a first communication to initiate a first communication event. The apparatus may include means for transmitting a first synchronization message during a first time resource associated with the first communication event, the first time resource associated with a first peripheral device. The apparatus may include means for transmitting a second synchronization message during a second time resource associated with the first communication event, the second time resource associated with a second peripheral device. The apparatus may include means for transmitting a second communication to initiate a second communication event. The apparatus may include means for monitoring for a first response from the first peripheral device during a third time resource associated with the first time resource, the third time resource associated with the second communication event. The apparatus may include means for monitoring for a second response from the second peripheral device during a fourth time resource associated with the second time resource, the fourth time resource associated with the second communication event.

Aspects generally include a method, apparatus, system, computer program product, non-transitory computer-readable medium, wireless communication device, and/or processing system as substantially described herein with reference to and as illustrated by the drawings, appendix, and/or specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
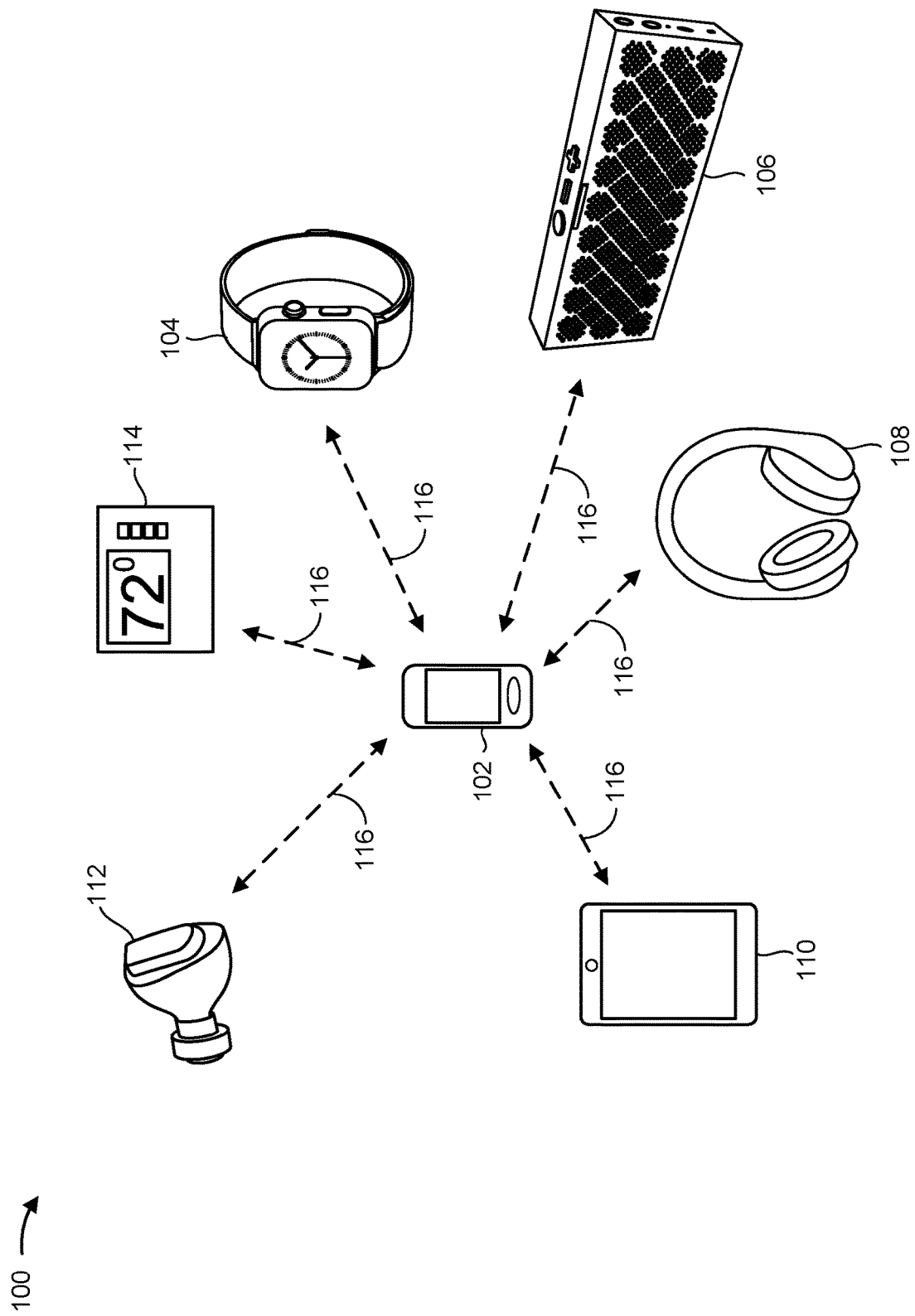
FIG. 1 is a diagram illustrating an example of a Wireless Personal Area Network (WPAN), in accordance with the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless personal area network (WPAN) 100, according to some implementations. Within the WPAN 100, a central device 102 may connect to and establish a BLE communication link 116 with one or more peripheral devices 104, 106, 108, 110, 112, 114 using a BLE protocol or a modified BLE protocol. The BLE protocol is part of the BT core specification and enables radio frequency communication operating within the globally accepted 2.4 GHz Industrial, Scientific & Medical (ISM) band.

The central device 102 may include suitable logic, circuitry, interfaces, processors, and/or code that may be used to communicate with one or more peripheral devices 104, 106, 108, 110, 112, or 114 using the BLE protocol or the modified BLE protocol as described herein. The central device 102 may operate as an initiator to request establishment of a link layer (LL) connection with an intended peripheral device 104, 106, 108, 110, 112, or 114. A link manager may be used to control operations between a WPAN application controller in the central device 102 and a WPAN application controller in each of the intended peripheral devices 104, 106, 108, 110, 112, and/or 114.

After a requested link layer connection is established, the central device 102 may become a host device, and the selected or intended peripheral device 104, 106, 108, 110, 112, or 114 may become paired with the central device 102 over the established link layer connection. As a host device, the central device 102 may be capable of supporting multiple link layer connections at a time with various peripheral devices 104, 106, 108, 110, 112, or 114 operating as client devices. Specifically, the central device 102 may manage various aspects of data packet communication in a link layer connection with one or more of the associated peripheral devices 104, 106, 108, 110, 112, or 114. For example, the central device 102 may determine an operation schedule in the link layer connection with one or more peripheral devices 104, 106, 108, 110, 112, or 114. The central device 102 may also initiate a link layer protocol data unit (PDU) exchange sequence over the link layer connection. Link layer connections may be configured to run periodic connection events in dedicated data channels. The exchange of link layer data PDU transmissions between the central device 102 and one or more of the peripheral devices 104, 106, 108, 110, 112, or 114 may take place within connection events.

In some implementations, the central device 102 may be configured to transmit the first link layer data PDU in each connection event to an intended peripheral device 104, 106, 108, 110, 112, or 114. In other implementations, the central device 102 may utilize a polling scheme to poll the intended peripheral device 104, 106, 108, 110, 112, or 114 for a link layer data PDU transmission during a connection event. The intended peripheral device 104, 106, 108, 110, 112, or 114 may transmit a link layer data PDU upon receipt of packet link layer data PDU from the central device 102. In some other implementations, a peripheral device 104, 106, 108, 110, 112, or 114 may transmit a link layer data PDU to the central device 102 without first receiving a link layer data PDU from the central device 102.

Examples of the central device 102 may include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player, a camera, a game console, a tablet, a smart device, a wearable device (such as a smart watch, wireless headphones, etc.), a vehicle, an electric meter, a gas pump, a toaster, a thermostat, a hearing aid, a blood glucose on-body unit, an Internet-of-Things (IoT) device, or any other similarly functioning device.

Examples of the one or more peripheral devices 104, 106, 108, 110, 112, or 114 may include a cellular phone, a smart phone, a SIP phone, a STA, a laptop, a PC, a desktop computer, a PDA, a satellite radio, a global positioning system, a multimedia device, a video device, a digital audio player, a camera, a game console, a tablet, a smart device, a wearable device (such as a smart watch, wireless headphones, etc.), a vehicle, an electric meter, a gas pump, a toaster, a thermostat, a hearing aid, a blood glucose on-body unit, an IoT device, or any other similarly functioning device. Although the central device 102 is illustrated in communication with six peripheral devices 104, 106, 108, 110, 112, or 114 in the WPAN 100, the central device 102 may communicate with more or fewer than six peripheral devices within the WPAN 100 without departing from the scope of the present disclosure.

A device implementing the BT protocol, such as the central device 102, may operate according to one radio mode, such as basic rate (BR)/enhanced data rate (EDR), and a device implementing the BLE protocol may operate according to a BLE radio mode. In some aspects, the central device 102 may be configured with dual radio modes, and therefore may be able to operate according to the BR/EDR mode or the BLE mode, for example, based on the type of short-rage wireless communication in which the device may engage.

For example, the central device 102 may operate according to the BR/EDR mode for continuous streaming of data, for broadcast networks, for mesh networks, and/or for some other applications in which a relatively higher data rate may be more suitable. However, the device may operate according to the BLE mode for short burst data transmissions, such as for some other applications in which power conservation may be desirable and/or a relatively lower data rate may be acceptable. In other aspects, the central device 102 may operate according to one or more other radio modes, including proprietary radio mode(s). Examples of other radio modes may include high speed radio modes, low energy radio modes, isochronous radio modes, etc.

As indicated above, FIG. 1 is provided as an example. Other examples may differ from what is described with regard to FIG. 1.

Figure 2:
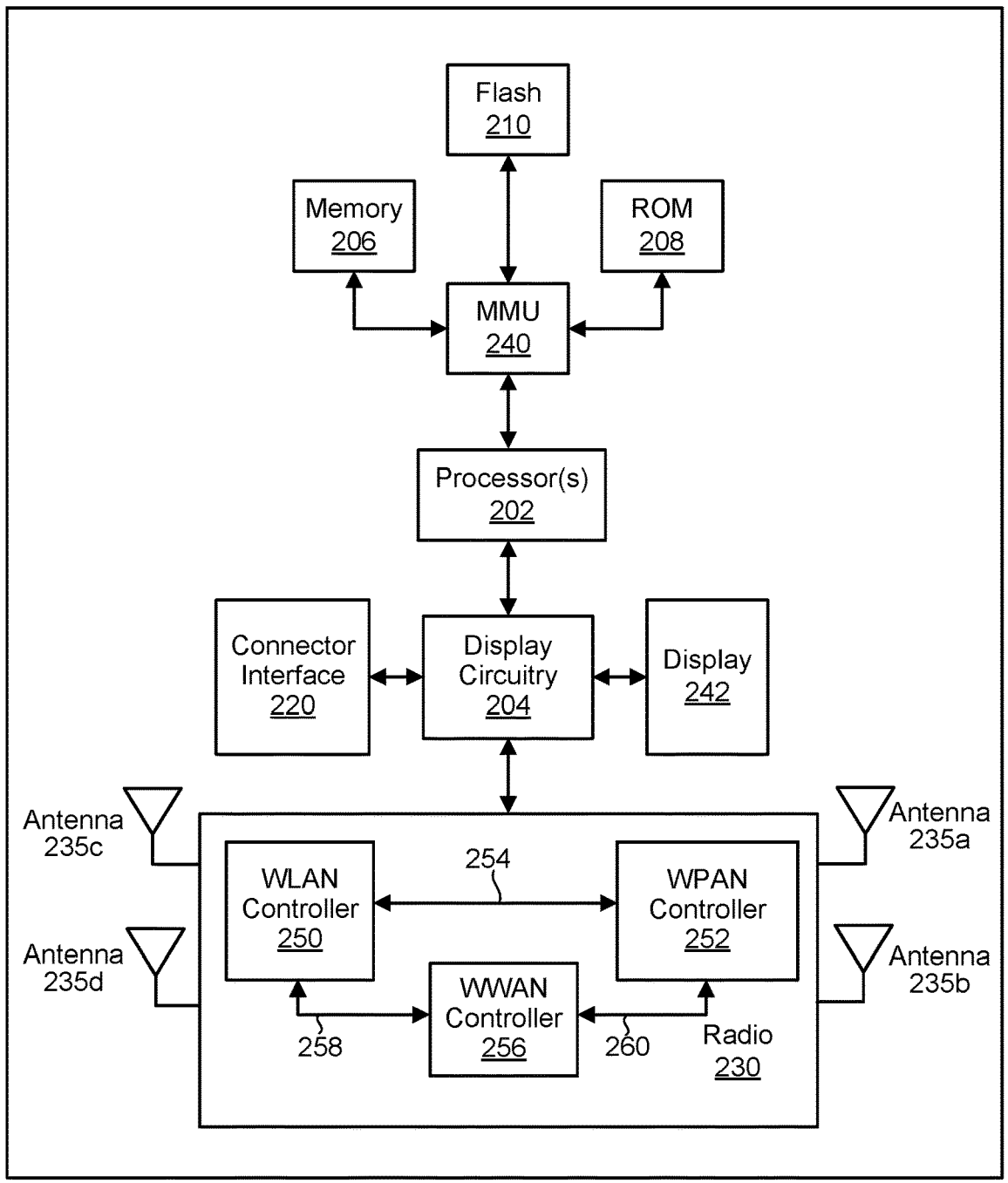
FIG. 2 is a diagram illustrating an example of a wireless communication device, in accordance with the present disclosure.

FIG. 2 is a diagram illustrating an example of a wireless communication device 200, in accordance with the present disclosure. In some instances, the wireless communication device 200 may be an example of the central device 102 of FIG. 1. In other instances, the wireless communication device 200 may be an example of one or more of the peripheral devices 104, 106, 108, 110, 112, or 114 of FIG. 1. In some aspects, the wireless communication device 200 may be a Bluetooth-enabled device (such as a BLE device).

As shown, the wireless communication device 200 may include a processing element, such as processor(s) 202, which may execute program instructions for the wireless communication device 200. The wireless communication device 200 may also include a display 242 that can perform graphics processing and present information to a user. The processor(s) 202 may also be coupled to memory management unit (MMU) 240, which may be configured to receive addresses from the processor(s) 202 and translate the addresses to address locations in memory such as memory 206, ROM 208, or flash memory 210 and/or to address locations in other circuits or devices, such as the display circuitry 204, radio 230, connector interface 220, and/or display 242. The MMU 240 may also be configured to perform memory protection and page table translation or set up. In some aspects, the MMU 240 may be included as a portion of the processor(s) 202.

The processor(s) 202 may be coupled to other circuits of the wireless communication device 200. For example, the wireless communication device 200 may include various types of memory, a connector interface 220 through which the wireless communication device 200 can communicate with the computer system, and wireless communication subsystems that can transmit data to, and receive data from, other devices based on one or more wireless communication standards or protocols. For example, in some aspects, the wireless communication subsystems may include (but are not limited to) a wireless local-area network (WLAN) subsystem, a Bluetooth subsystem, or a cellular subsystem (such as a Long-Term Evolution (LTE) or $5^{th}$ generation (5G) New Radio (NR) subsystem). The wireless communication device 200 may include a plurality of antennas 235a, 235b, 235c, or 235d for performing wireless communication with, for example, wireless communication devices in a WPAN.

The wireless communication device 200 may be configured to implement part or all of the techniques described herein by executing program instructions stored on a memory medium (such as a non-transitory computer-readable memory medium) and/or through hardware or firmware operation. In other embodiments, the techniques described herein may be at least partially implemented by a programmable hardware element, such as a FPGA, and/or an application specific integrated circuit (ASIC).

In certain aspects, the radio 230 may include separate controllers configured to control communications for various respective radio access technology (RAT) protocols. For example, as shown in FIG. 2, radio 230 may include a WLAN controller 250 that manages WLAN communications, a Bluetooth controller 252 that manages Bluetooth and BLE communications, and a wireless wide area network (WWAN) controller 256 that manages WWAN communications. In certain aspects, the wireless communication device 200 may store and execute a WLAN software driver for controlling WLAN operations performed by the WLAN controller 250, a Bluetooth software driver for controlling Bluetooth operations performed by the Bluetooth controller 252, and/or a WWAN software driver for controlling WWAN operations performed by the WWAN controller 256.

In certain implementations, a first coexistence interface 254 (such as a wired interface) may be used for sending information between the WLAN controller 250 and the Bluetooth controller 252. In certain other implementations, a second coexistence interface 258 may be used for sending information between the WLAN controller 250 and the WWAN controller 256. In certain other implementations, a third coexistence interface 260 may be used for sending information between the Bluetooth controller 252 and the WWAN controller 256.

In some aspects, one or more of the WLAN controller 250, the Bluetooth controller 252, and/or the WWAN controller 256 may be implemented as hardware, software, firmware or some combination thereof.

In certain configurations, the WLAN controller 250 may be configured to communicate with a second device in a WPAN using a WLAN link using all of the antennas 235a, 235b, 235c, and 235d. In certain other configurations, the Bluetooth controller 252 may be configured to communicate with at least one second device in a WPAN using one or more of the antennas 235a, 235b, 235c, and 235d. In certain other configurations, the WWAN controller 256 may be configured to communicate with a second device in a WPAN using all of the antennas 235a, 235b, 235c, and 235d. The WLAN controller 250, the Bluetooth controller 252, and/or the WWAN controller 256 may be configured to adjust wakeup time interval and shutdown time for the device.

A short-range wireless communications protocol, such as BT, BLE, and/or BR/EDR, may include and/or may use one or more other communications protocols, for example, for establishing and maintaining communications links. Referring also to FIG. 1, the wireless communication device 200 may establish a communications link 116 with one or more peripheral devices, such as a wireless headset 112, according to at least one communications protocol for short-range wireless communications.

The communications link 116 may include a communications link that adheres to a protocol included and/or for use with BT, BLE, BR/EDR, etc. In one aspect, the communications link 116 may include an asynchronous connectionless (ACL) link. When operating as an ACL link, the communications link 116 may allow the central device 102 (e.g., a source device) to connect or "pair" with a peripheral device, such as the headset 112. The connection is asynchronous in that the two devices may not need to synchronize, timewise, data communications between each other to permit communication of data packets via the communications link 116.

A Logical Link Control and Adaptation Protocol (L2CAP) may be used within a BT protocol stack (not shown in FIG. 2 for simplicity). An L2CAP connection may be established after an ACL link has been established. Reference to L2CAP in the present disclosure may be further applicable to enhanced L2CAP (EL2CAP), which may be an enhanced version of the L2CAP protocol that enables multiplexing of multiple logical data channels via a single radio connection.

In one aspect, the communications link 116 may include an Advanced Audio Distribution Profile (A2DP) link. An A2DP link provides a point-to-point link between a source device, such as the central device 102, and a sync device, such as the headset 112. With an A2DP link, data packets including audio may be transmitted over an ACL data channel, and other information, for example, for controlling the audio stream, may be transmitted over a separate control channel. The data packets may occur non-periodically.

In another aspect, the communications link 116 may support synchronous logical transport mechanisms between a source device (such as the central device 102) and a peripheral device (such as the headset 112). For example, the communications link 116 may include a synchronous connection-oriented (SCO) link that provides a symmetric point-to-point link between the source device and the peripheral device using time slots reserved for BT communications. In some aspects, an SCO link may not support retransmission of data packets, which may be unsatisfactory in audio streaming and/or voice use cases in which a dropped audio or voice packet may reduce the quality of the user experience.

In a further aspect, the communications link 116 may include an extended SCO (eSCO) link. An eSCO link may provide a symmetric or asymmetric point-to-point link between a source device and a peripheral device using time slots reserved for BT communications, and may also provide for a retransmission window following the reserved time slots. Because retransmissions may be facilitated using the retransmission window, an eSCO link may be suitable for audio streaming and/or voice use cases because a dropped audio or voice packet may be retransmitted, and therefore the probability of successfully receiving a data packet may be increased.

In one aspect, the communications link 116 may include an isochronous (ISO) link. When operating as an ISO link, the communications link 116 may combine some features of both synchronous and asynchronous links. For example, a stream on an ISO link may begin with a start packet, and then data packets may be asynchronously transmitted. On an ISO link, the number of retransmission attempts by a transmitting device may be limited. Thus, if a receiving device is unable to decode a data packet within the limited number of retransmission attempts, then the data packet may be dropped, and the receiving device may continue to receive the stream without data from the dropped data packet.

As described in more detail elsewhere herein, the Bluetooth Controller 252 (or a WPAN controller) and/or WWAN controller 256 may establish a WPAN low energy (LE) connection with a receiving device, the WPAN LE connection being associated with a first number of transmission occasions for each transmission interval; identify an event associated with one or more of: a number of communications that satisfies a quantity threshold, or one or more communications having a latency requirement that satisfies a latency threshold; and transmit, to the receiving device and based at least in part on identifying the event, an indication to communicate using a more data (MD) mode, the MD mode being associated with a second number of transmission occasions for each transmission interval, the second number being greater than the first number. Additionally, or alternatively, the Bluetooth controller 252 may perform one or more other operations described herein.

In some aspects, the central device includes means for transmitting a first communication to initiate a first communication event; means for transmitting a first synchronization message during a first time resource associated with the first communication event, the first time resource associated with a first peripheral device; means for transmitting a second synchronization message during a second time resource associated with the first communication event, the second time resource associated with a second peripheral device; means for transmitting a second communication to initiate a second communication event; means for monitoring for a first response from the first peripheral device during a third time resource associated with the first time resource, the third time resource associated with the second communication event; and/or means for monitoring for a second response from the second peripheral device during a fourth time resource associated with the second time resource, the fourth time resource associated with the second communication event. In some aspects, the means for the central device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the means for the wireless communication device to perform operations described herein may include, for example, one or more of Bluetooth controller 252, WWAN controller 256.

As indicated above, FIG. 2 is provided as an example. Other examples may differ from what is described with regard to FIG. 2.

Figure 3:
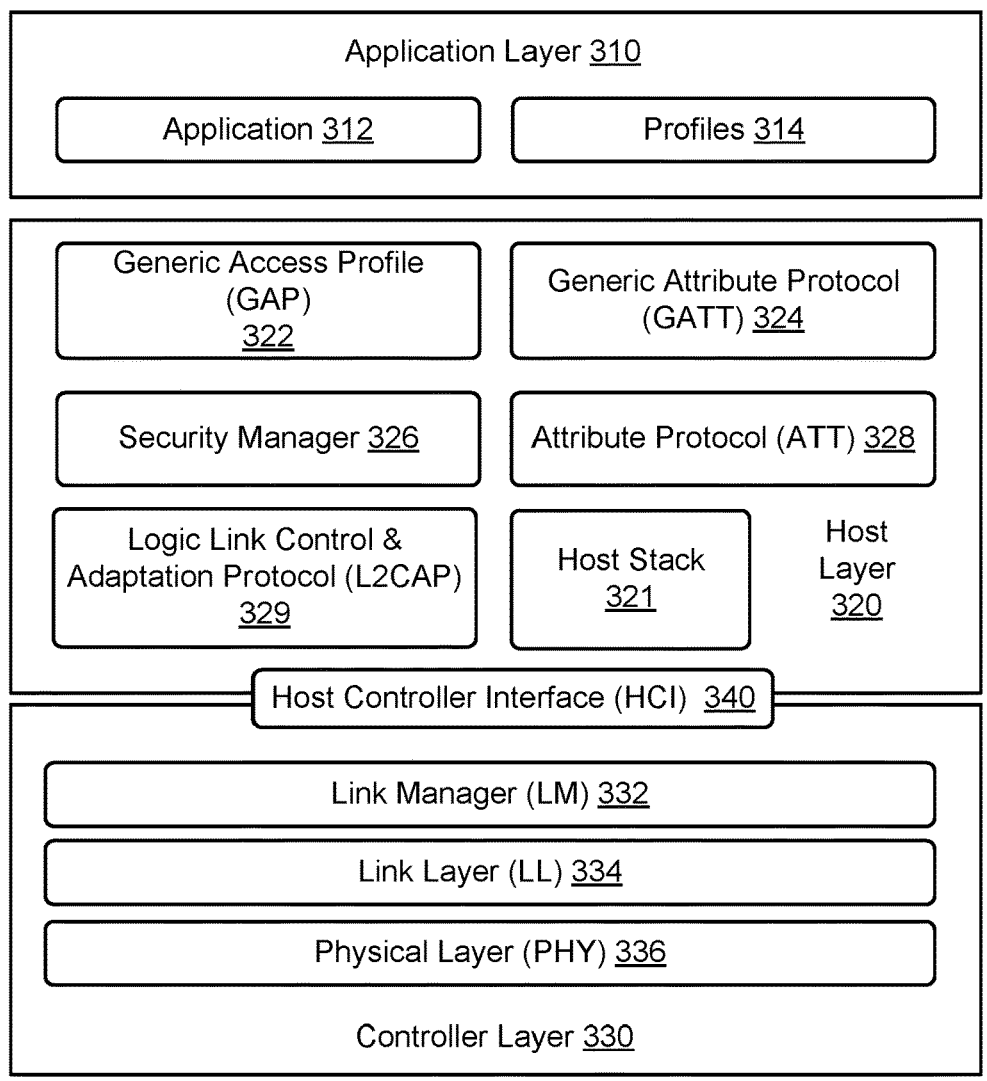
FIG. 3 is a diagram illustrating an example of a protocol stack, in accordance with the present disclosure.

FIG. 3 is a diagram illustrating an example 300 of a protocol stack (e.g., a WPAN and/or a Bluetooth protocol stack), in accordance with the present disclosure. The protocol stack 300 may be implemented in a wireless communication device (such as the central device 102 or one or more of the peripheral devices 104, 106, 108, 110, or 112 of FIG. 1). For example, the BT protocol stack 300 may be implemented by one or more of processor(s) 202, memory 206, flash memory 210, ROM 208, the radio 230, and/or the Bluetooth controller 252 illustrated in FIG. 2. The BT protocol stack 300 may be organized into three layers including application layer 310, a host layer 320, and a controller layer 330.

The application layer 310 may be a user application that interfaces with the other blocks and/or layers of the BT protocol stack 300. In some aspects, the application layer 310 may include one or more applications 312 and one or more Bluetooth profiles 314 that allow the applications to use the Bluetooth and BLE communications. The host layer 320 may include the upper layers of the BT protocol stack 300, and may communicate with a controller (such as the Bluetooth controller 252 of FIG. 2) in a wireless communication device using a host controller interface (HCI) 340. In some aspects, the host layer 320 may include a host stack 321 that can be used for application layer interface management to allow an application to access Bluetooth communications.

The controller layer 330 may include the lower layers of the BT protocol stack 300. The controller layer 330, which may be used for hardware interface management, link establishment, and link management, is shown to include a link manager (LM) 332, a link layer 334, and a physical (PHY) layer 336. The PHY layer 336 may include, for example, a radio and/or a baseband processor. In some aspects, the PHY layer 336 may define the mechanism for transmitting a bit stream over a physical link or channel that connects BT devices. The bit stream may be grouped into code words or symbols, and converted to a data packet that is transmitted over a wireless transmission medium. The PHY layer 336 may provide an electrical, mechanical, and/or procedural interface to the wireless transmission medium. The PHY layer 336 may be responsible for modulation and demodulation of data into radio frequency (RF) signals for transmission over the air. The PHY layer 336 may describe the physical characteristics of a wireless communication device's receiver/transmitter. The physical characteristics may include modulation characteristics, radio frequency tolerance, sensitivity level, etc.

The link layer 334 is responsible for low-level communication over the PHY layer 336. The link layer 334 334 manages the sequence and timing for transmitting and receiving data packets, and using a LL protocol, communicates with other devices regarding connection parameters and data flow control. The link layer 334 also provides gatekeeping functionality to limit exposure and data exchange with other devices. If filtering is configured, the link layer 334 maintains a list of allowed devices and will ignore all requests for data exchange from devices not on the list. The link layer 334 may also reduce power consumption. In some aspects, the link layer 334 may include a company's proprietary LL that may be used to discover peer devices, and establish a secure communication channel therewith. In certain aspects, the link layer 334 may be responsible for transporting data packets between devices in a WPAN. Each data packet may include an access address, which specifies the type of logical transport used to carry the data packet. Logical transports may exist between a master device and slave devices. Additionally, some logical transports may carry multiple logical links.

The link manager 332 may be responsible for establishing and configuring links and managing power-change requests, among other tasks. Each type of logical link, such as ACL links, A2DP links, SCO links, eSCO links, ISO links, etc., may be associated with a specific packet type. For example, an SCO link may provide reserved channel bandwidth for communication between a master device and a slave device, and support regular, periodic exchange of data packets with no retransmissions. An eSCO link may provide reserved channel bandwidth for communication between a source device and a peripheral device, and support regular, periodic exchange of data packets with retransmissions. An ACL link may exist between a source device and a peripheral device from the beginning of establishment of a connection between the source device and the peripheral device, and the data packets for ACL links may include encoding information in addition to a payload.

The link manager 332 may communicate with the Host layer 320 using the HCI 340. In some instances, the link manager 332 may translate HCI 340 commands into controller-level operations, such as baseband-level operations. The HCI 340 may act as a boundary between the lower layers (such as between the controller layer 330, the host layer 320, and the application layer 310). The BT specification may define a standard HCI to support BT systems that are implemented across two separate processors. For example, a BT system on a computer may use the BT system's own processor to implement the lower layers of the BT protocol stack 300, such as the PHY layer 336, the link layer 334, and/or the link manager 332. In some aspects, the BT system may use a processor of a BT component to implement the other layers of the BT protocol stack 300 such as, for example, the host layer 320 and the application layer 310.

The host layer 320 is shown to include a generic access profile (GAP) 322, a generic attribute protocol (GATT) 324, a security manager (SM) 326, attribute protocol (ATT) 328, and a L2CAP layer 329. The GAP 322 may provide an interface for the application 312 to initiate, establish, and manage connections with other BT or BLE devices. The GATT 324 may provide a service framework using the attribute protocol for discovering services, and for reading and writing characteristic values on a peer device. The GATT 324 may interface with the application 312, for example, through a profile which may define a collection of attributes and any permission needed for the attributes to be used in BT or BLE communications.

The security manager 326 may be responsible for device pairing and key distribution. A security manager protocol implemented by the security manager 326 may define how communications with the security manager of a counterpart BLE device are performed. The security manager 326 provides additional cryptographic functions that may be used by other components of the BT protocol stack 300. The architecture of the security manager 326 used in Bluetooth communications is designed to minimize recourse requirements for peripheral devices by shifting work to an assumingly more powerful central device. BLE uses a pairing mechanism for key distribution. The security manager 326 provides a mechanism to not only encrypt the data but also to provide data authentication.

The ATT 328 includes a client/server protocol based on attributes associated with a BLE device configured for a particular purpose. Examples may include monitoring heart rate, temperature, broadcasting advertisements, etc. The attributes may be discovered, read, and written by peer devices. The set of operations which are executed over ATT 328 may include, but are not limited to, error handling, server configuration, find information, read operations, write operations, queued writes, etc. The ATT 328 may form the basis of data exchange between BT and BLE devices.

The L2CAP layer 329 may be implemented above the HCI 340, and may communicate with the controller layer 330 through the HCI 340. The L2CAP layer 329 may be primarily responsible for establishing connections across one or more existing logical links and for requesting additional links if none exist. The L2CAP layer 329 may also implement multiplexing between different higher-layer protocols, for example, to allow different applications to use a single link, such as a logical link, including an ACL link. In some implementations, the L2CAP layer 329 may encapsulate multiple protocols from the upper layers into a data packet format (and vice versa). The L2CAP layer 329 may also break packets with a large data payload from the upper layers into multiple packets with the data payload segmented into smaller size data payloads that fit into a maximum payload size (for example, twenty-seven bytes) on the transmit side.

In some standards and protocols, such as BLE and/or BR/EDR, the central device 102 may detect errors in a packet and/or a dropped/missed/not received packet through the use of cyclic redundancy check (CRC) validation and through the use of message integrity code (MIC) validation. MIC validation may be used when a packet is encrypted. For example, failure of CRC validation may indicate one or more errors in a received packet and failure of MIC validation may indicate that another packet has not been received (although failure of CRC validation may also indicate another packet has not been received and/or failure of MIC validation may also indicate one or more errors in a received packet).

CRC validation and MIC validation may be based on generating CRC values and MICs, respectively, based on received packets and respectively comparing those generated CRC values and MICs to CRC and MICs included in received packets. Specifically, a receiving device, such as the headset 112, that receives a packet may first generate a CRC value or a CRC checksum based on the received packet, such as based on a payload and, if applicable, a MIC included in the received packet. The receiving device may compare the generated CRC value with a CRC value included in the received packet. If the generated CRC value matches the CRC value included in the received packet, then the received packet may be validated for CRC. The CRC-validated received packet may then be decrypted. However, if the generated CRC value does not match the CRC value included in the received packet, then the receiving device may determine that the received packet fails CRC validation. If the receiving device determines the received packet fails CRC validation, then the received packet may include errors and/or may be corrupted. In one configuration, the receiving device may discard the received packet that fails CRC validation; however, in another configuration, the receiving device may attempt to recover the received packet, for example, using one or more error correction techniques.

If the received packet is encrypted and passes CRC validation, then the receiving device may decrypt the received packet to obtain a decrypted payload and a decrypted MIC. For MIC validation, the receiving device may generate a MIC based on the decrypted payload, and compare the generated MIC with the MIC obtained from the decrypted received packet. If the generated MIC matches the decrypted MIC, then the receiving device may determine that the received packet is successfully decrypted. When the received packet is successfully decrypted, the decoded and decrypted payload of the received packet may be provided to another layer of the receiving device, such as a coder-decoder (codec) of the receiving device that may cause the payload data of the received packet to be output by the receiving device, for example, as audio through speakers of the headset 112.

If the generated MIC does not match the decrypted MIC of the received packet, then the receiving device may determine that the received packet is unsuccessfully decrypted. When the received packet is unsuccessfully decrypted, then a different packet may have been missed or the received packet may be erroneous or otherwise corrupted. In one configuration, the receiving device may discard the received packet that fails MIC validation; however, in another configuration, the receiving device may attempt to recover the received packet.

As indicated above, FIG. 3 is provided as an example. Other examples may differ from what is described with regard to FIG. 3.

Figure 4:
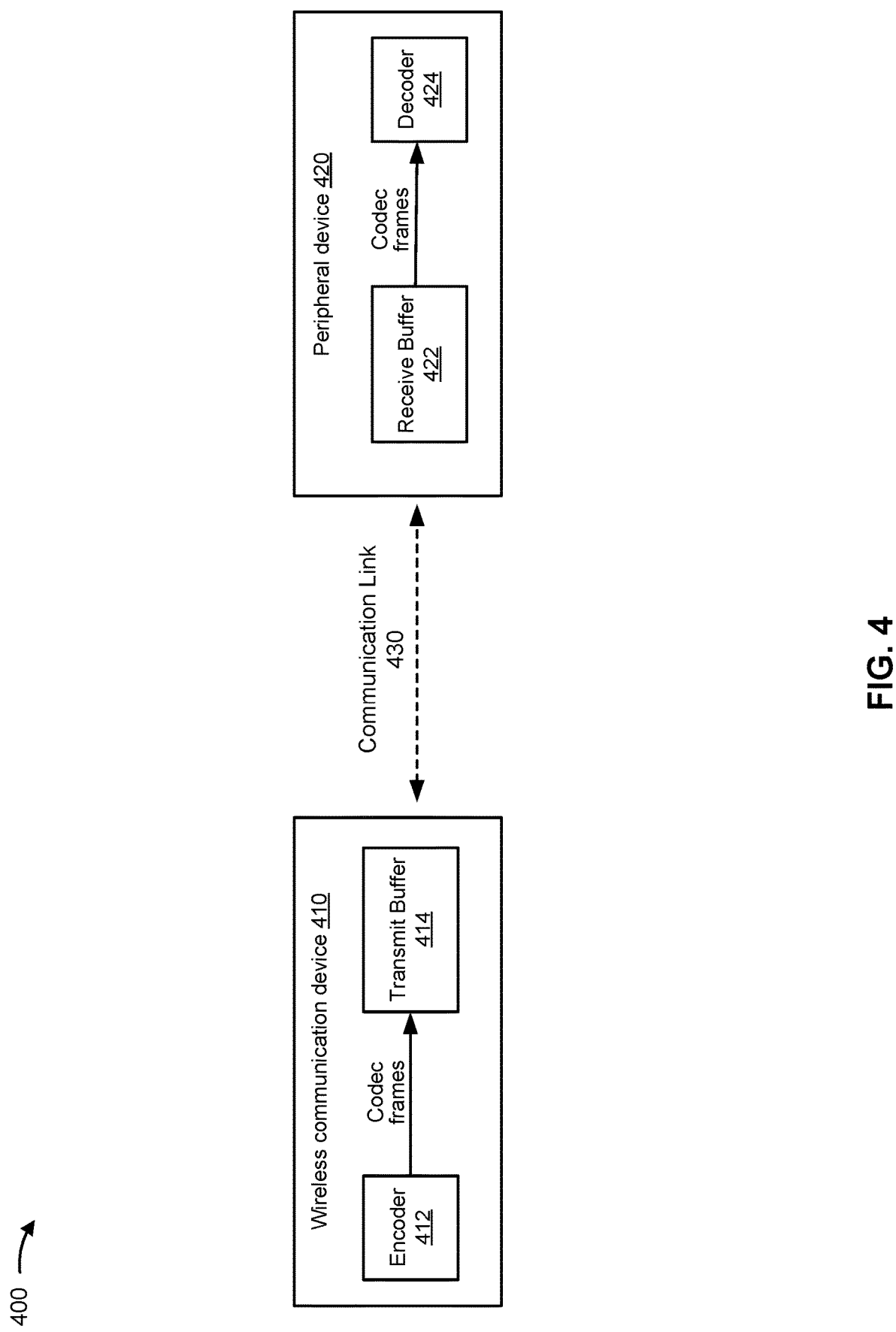
FIG. 4 is a diagram illustrating an example transmission of a data packet from a wireless communication device to a peripheral device, in accordance with the present disclosure.

FIG. 4 depicts an example transmission 400 of data packets from a wireless communication device 410 to a peripheral device 420 over a communication link 430, according to the present disclosure. In some implementations, the wireless communication device 410 may be one example of the central device 102 of FIG. 1, or the wireless communication device 200 of FIG. 2, and the peripheral device 420 may be an example of one or more of the peripheral devices 104, 106, 108, 110, 112 or 114 of FIG. 1. In some instances, the peripheral device 420 may be a pair of earbuds. The communication link 430 may be any suitable Bluetooth connection or link. In some instances, the communication link 430 may be one or more of an ACL link, an L2CAP link, an A2DP link, an SCO link, or an ISO link.

The wireless communication device 410 is shown to includer an encoder 412 and a transmit buffer 414. The encoder 412 may be configured to encode data, such as audio or video data, using a specified bitrate. The transmit buffer 414 may be configured to queue data packets that are to be transmitted over the communication link 430 to the peripheral device 420. In some implementations, the data packets to be transmitted over the communication link 430 may be of a predefined size, for example, based on the type of communication link 430 and/or channel conditions associated with the communication link 430. In some aspects, data encoded by the encoder 412 may be packetized into a data packet of a predefined size. The wireless communication device 410 may de-queue data packets from the transmit buffer 414 and transmit the data packets to the peripheral device 420 over the communication link 430.

The peripheral device 420 is shown to includer a receive buffer 422 and a decoder 424. Data packets received over the communication link 430 may be queued or otherwise stored in the receive buffer 422. The data packets may be output from the receive buffer 422 and forwarded to the decoder 424. In some aspects, the decoder 424 may decode data (such as audio and/or video data) carried in the payloads of the queued data packets, and forward the decoded data to upper layers of the protocol stack for processing and playback to a user. In some implementations, the encoder 412 may encode a first encoder/decoder (codec) frame using a first bitrate and forward the first codec frame to the transmit buffer 414 to be packetized for transmission to the peripheral device 420 over the communication link 430. The peripheral device 420 may queue the received data packet in the receive buffer 422 and may forward the first portion of the first codec frame to the decoder 424 for decoding.

As indicated above, FIG. 4 is provided as an example. Other examples may differ from what is described with regard to FIG. 4.

Figure 5:
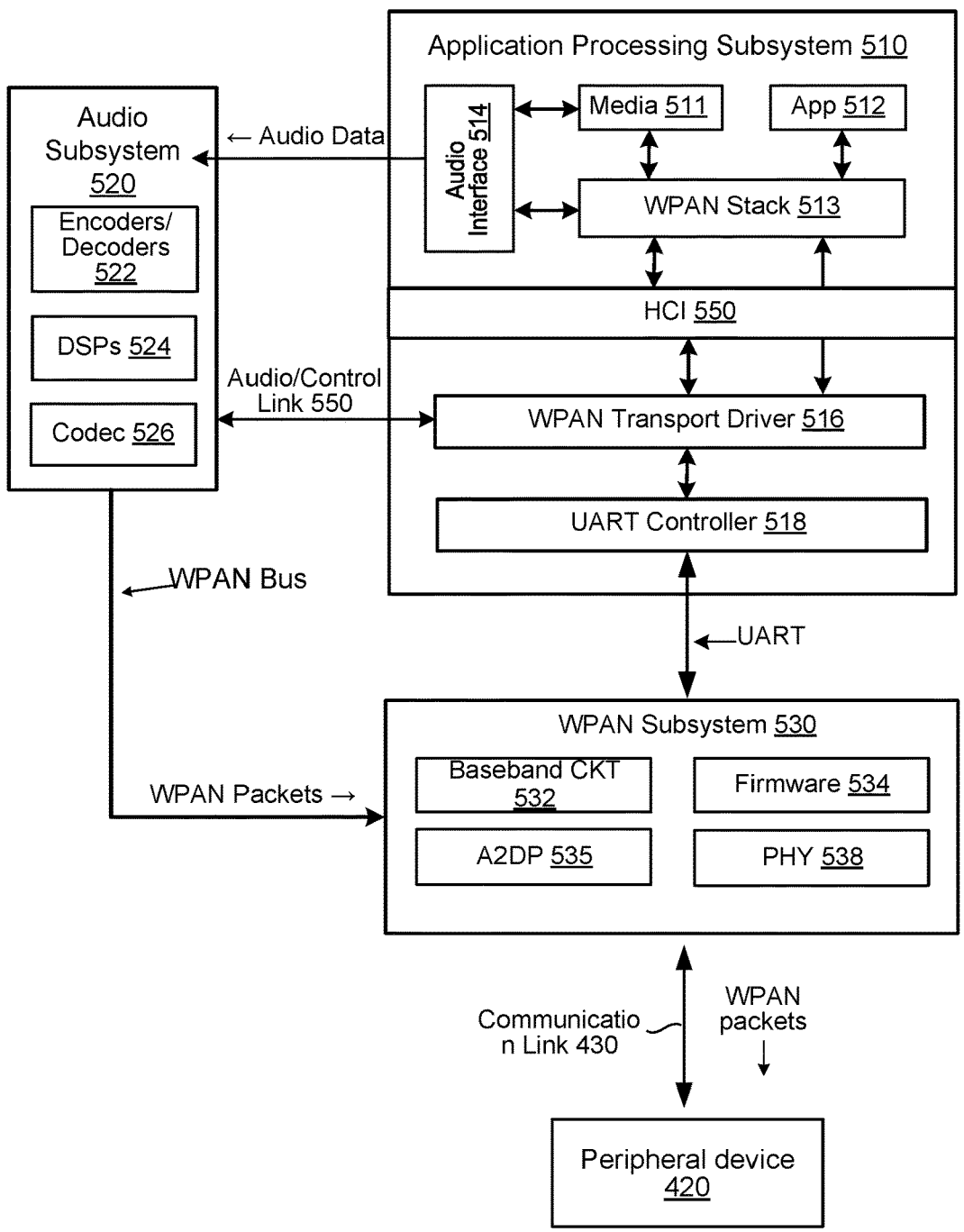
FIG. 5 is a diagram illustrating an example of a wireless communication device, in accordance with the present disclosure.

FIG. 5 shows a block diagram of another example wireless communication device 500, according to the present disclosure. In some implementations, the wireless communication device 500 may be an example of the central device 102 of FIG. 1, the wireless communication device 200 of FIG. 2, or the wireless communication device 410 of FIG. 4. In the example of FIG. 5, the wireless communication device 500 is depicted as having an established communication link 430 (e.g., a Bluetooth communication connection) with the peripheral device 420 of FIG. 4.

The wireless communication device 500 may include an application processing subsystem 510, an audio subsystem 520, a Bluetooth subsystem 530, and an HCI 550. The application processing subsystem 510, which may correspond to at least some portions of the application layer 310 and the host layer 320 of the BT protocol stack 300 of FIG. 3, is shown to include a media player 511, an application layer 512, a Bluetooth stack 513, and an audio interface 514. The media player 511 can be suitable device or component capable of generating or receiving multimedia content including, for example, real-time audio streams, real-time video streams, real-time gaming streams, and other latency-sensitive traffic. The application layer 512, which may be one implementation of the application layer 310 of FIG. 3, includes at least one Bluetooth profile that defines the collection of attributes and associated permissions to be used in Bluetooth or BLE communications. In some aspects, the application layer 512 may include processing resources including (but not limited to) the memory 206, the ROM 208, and the flash memory 210 of FIG. 2. The Bluetooth stack 513 may be one implementation of the BT protocol stack 300 of FIG. 3.

The Bluetooth transport driver 516 may include a split audio and packetization module (not shown for simplicity) that can packetize data (such as audio and/or video data) into Bluetooth frames that can be transmitted to the peripheral device 420 using either a Bluetooth or BLE protocol.

The Bluetooth transport driver 516 is connected to the audio subsystem 520 via an audio and control link 560. In some instances, the audio and control link 560 may be used to send encoded audio/video data and control signals between the Bluetooth transport driver 516 and audio/video DSPs within the audio subsystem 520.

The Bluetooth transport driver 516 is connected to a universal asynchronous receiver-transmitter (UART) controller 518 that provides controls for transmission of information via a Bluetooth connection.

The audio subsystem 520 may include encoders/decoders 522, one or more DSPs 524, and one or more codecs 526. The encoders/decoders 522 may be used to sample audio/video data extracted from one or more packets received from another wireless communication device. The extracted audio/video data may be processed in the application processing subsystem 510 based at least in part on the Bluetooth profile. In some implementations, the encoders/decoders 522 may partition the sampled audio/video data into payloads that can be embedded within one or more Bluetooth packets for transmission to the peripheral device 420 over a Bluetooth or BLE connection. In some instances, the DSPs 524 and/or the codecs 526 may employ one or more encoding or decoding algorithms in conjunction with sampling the audio data.

The Bluetooth subsystem 530 may include a baseband circuit (CKT) 532 (e.g., Bluetooth baseband circuit), Bluetooth firmware 534, an advanced audio distribution profile (A2DP) circuit 536, and a PHY 538. The baseband circuit 532 and the Bluetooth firmware 534 may be used to generate baseband signals for constructing and deconstructing data frames based on the Bluetooth or BLE protocol. The baseband circuit 532 and the Bluetooth firmware 534 may also be used to generate carrier signals for up-converting baseband signals during data transmissions and for down-converting received data signals to baseband. The A2DP circuit 536 may be used to control or manage an A2DP link between the wireless communication device 500 and the peripheral device 420. Specifically, when the Bluetooth subsystem 530 is in a receive mode, the PHY 538 can be used to receive, demodulate, and down-convert data packets received over the communication link 430, and to forward the data packets to the application processing subsystem 510. When the Bluetooth subsystem 530 is in a transmit mode, the PHY 538 can be used to encapsulate data provided from the upper layers into one or more Bluetooth frames or packets for transmission to the peripheral device 420 over the communication link 430.

As indicated above, FIG. 5 is provided as an example. Other examples may differ from what is described with regard to FIG. 5.

Figure 6:
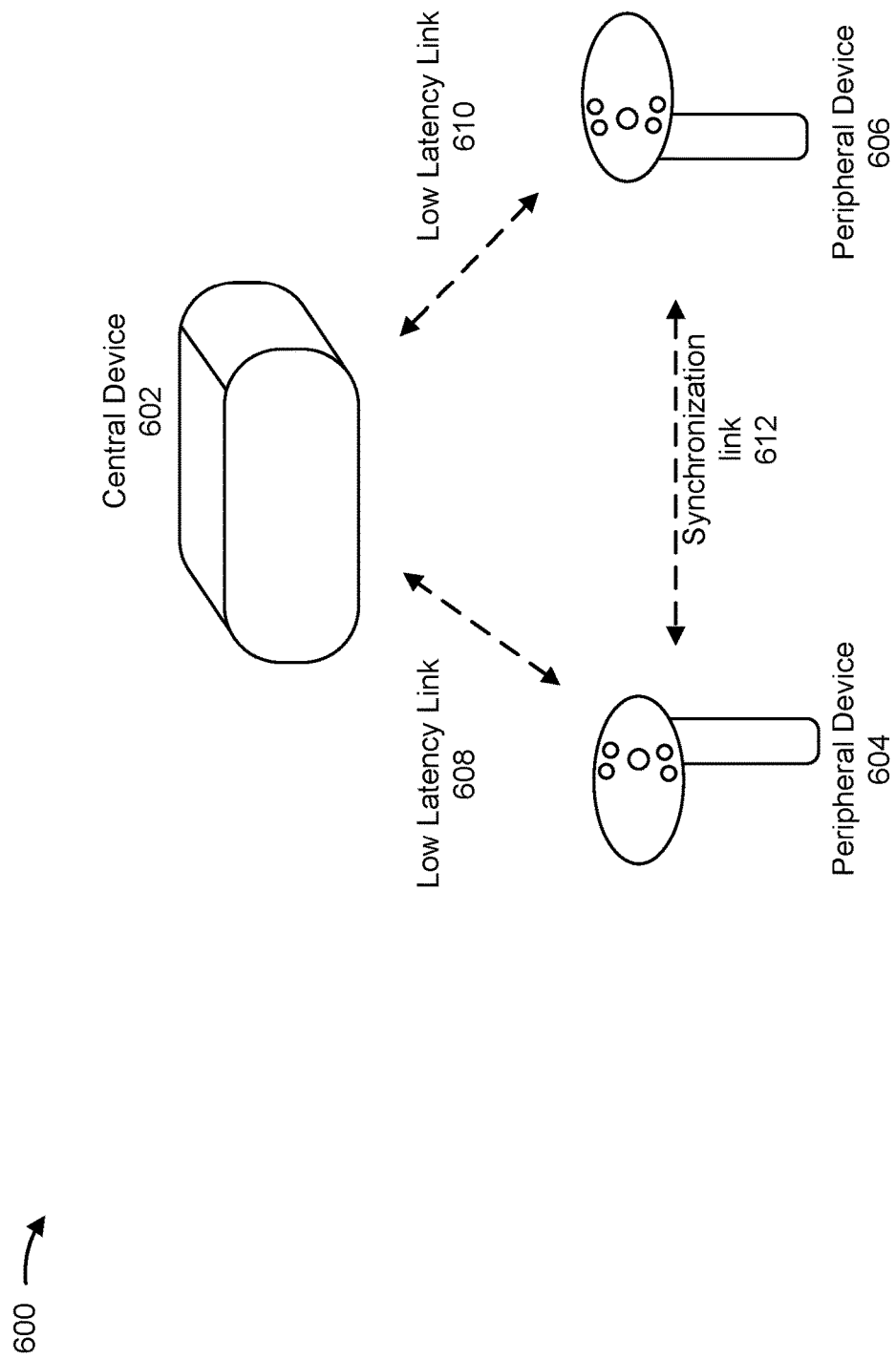
FIG. 6 is a diagram illustrating an example of wireless communication devices in a WPAN connection, in accordance with the present disclosure.

FIG. 6 is a diagram illustrating an example 600 of communication via an extended reality (XR) WPAN connection, in accordance with the present disclosure. In some examples, the XR WPAN connection may include a BLE connection and/or a modified BLE connection. For example, the XR WPAN connection may be configured to support multiple peripheral devices 604 and 606 associated with a single application at a central device 602. The multiple peripheral devices 604 and 606 may provide movement data (e.g., haptic data) and/or input data (e.g., input received at one or more buttons or joysticks of the multiple peripheral devices 604 or 606). The XR WPAN connection may be configured to modify a display associated with the central device 602 based at least in part on the movement data and/or the input data.

As shown in FIG. 6, the central device 602 and the peripheral device 604 may communicate via a low latency link 608. The central device 602 and the peripheral device 606 may communicate via a low latency link 610. In some examples, the peripheral device 604 and the peripheral device 606 may communicate via a synchronization link 612.

In some networks, the links 608-612 may have strict latency parameters to maintain a user experience in an XR environment. For example, poor latency may result in user dizziness, unrealistic interactions in the XR environment, and/or communication errors based at least in part on unsynchronized data from the multiple peripheral devices 604 and 606.

As indicated above, FIG. 6 is provided as an example. Other examples may differ from what is described with regard to FIG. 6.

Figure 7:
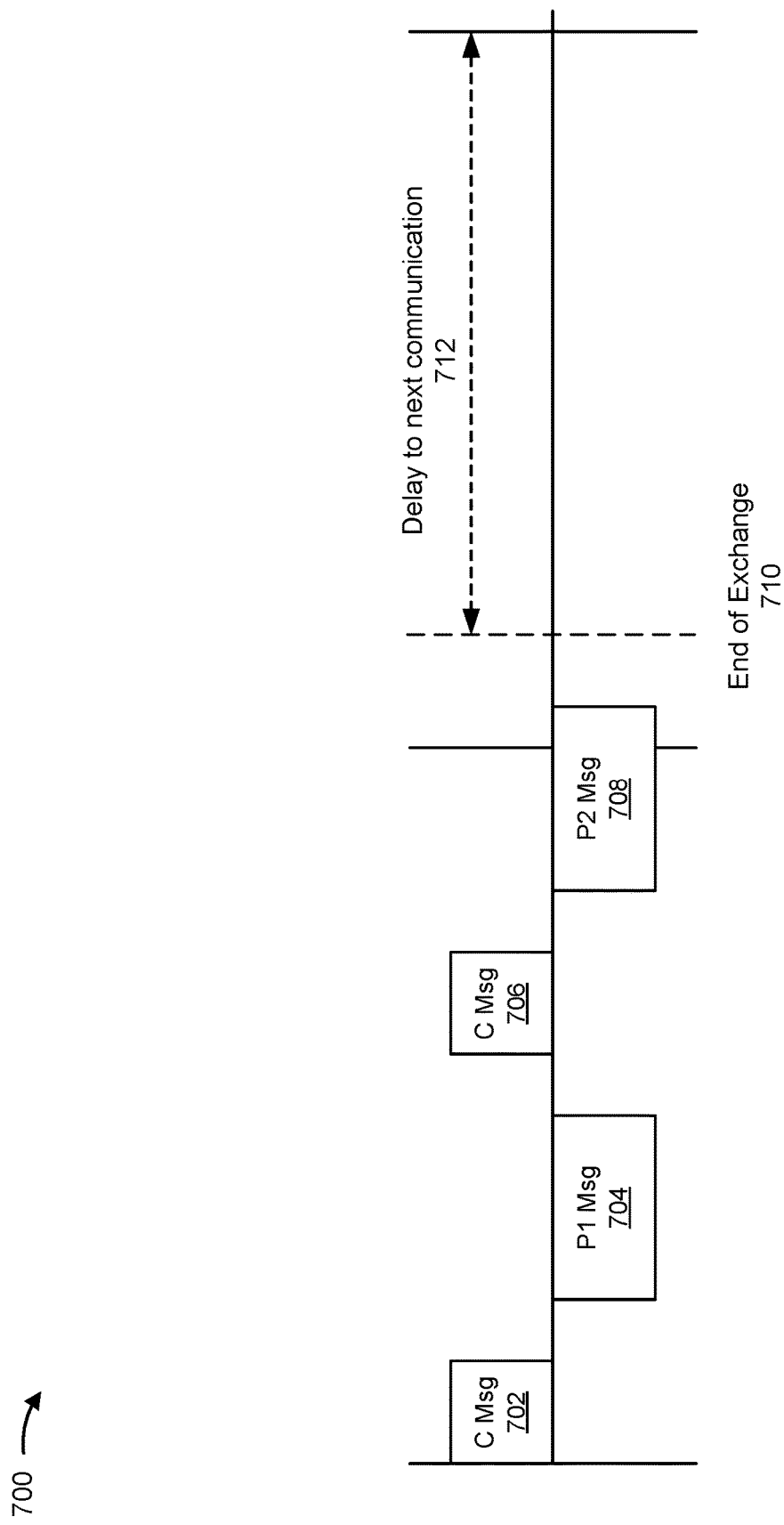
FIG. 7 is a diagram illustrating an example of communication via a WPAN connection, in accordance with the present disclosure.

FIG. 7 is a diagram illustrating an example 700 of communication via an XR WPAN connection, in accordance with the present disclosure. In some examples, the XR WPAN connection may include a BLE connection and/or a modified BLE connection. For example, the XR WPAN connection may be configured to support multiple peripheral devices associated with a single application at a central device. The multiple peripheral devices may provide movement data (e.g., haptic data) and/or input data (e.g., input received at one or more buttons or joysticks of the multiple peripheral devices). The XR WPAN connection may be configured to modify a display associated with the central device based at least in part on the movement data and/or the input data.

In some networks, the XR WPAN connection may be associated with one or more constraints. For example, the XR WPAN connection may communicate with a 1000 μs interval. Additionally, or alternatively, the peripheral devices (e.g., XR controllers) may communicate with, for example, at least 29 octets from per interval. In some networks, the one or more constraints may be 900 μs communication intervals and at least 40 octets from each peripheral device per interval.

FIG. 7 shows an amount of time used to exchange packets between the central device and the peripheral devices within the 1000 μs interval. Timing for a central to peripheral packet may include either 0 or 10 octets and a peripheral to central packet of 30 octets. Additionally, timing of interframe spacing (TIFS) and timing of minimum subevent space (TMSS) may be set to a standard value of 150 μs. Isochronous channels configurations may have a burst number (BN)=1 (one packet per ISO interval), flush timeout (FT)=1 (each packet flushed at the end of each interval), and number of subevents (NSE)=1 (1 transmission opportunity per connected isochronous stream (CIS) per interval). Additionally, or alternatively, for the sequence to be viable, 150 μs after the second peripheral packet may be available to change frequencies.

As shown in FIG. 7, the central device and the peripheral devices may use isochronous channels (e.g., with equal time intervals between communications) with each peripheral using a separate CIS. The central device may transmit a central message (C Msg) 702 during a first time resource at or around a beginning of a communication interval (e.g., an event-based communication interval). The CIS may include an indication of resources allocated to subsequent communications (e.g., a poll message). A first peripheral device may transmit a first peripheral message (P1 Msg) 704 during a second time resource of the communication interval (e.g., as indicated by the C Msg 702). The central device may transmit a C Msg 706 during a third time resource that provides an indication of resources allocated to subsequent communications. A second peripheral device may transmit a second peripheral message (P2 Msg) 708 during a fourth time resource of the communication interval (e.g., as indicated by the C Msg 706).

For any number of octets in the C Msgs, an amount of time for the exchange exceeds the 1000 μs limit. For example, P2 Msg 708 ends beyond the 1000 μs limit, which may be prohibited and/or which may cause the central device and the peripheral devices to miss an opportunity to communicate during a next 1000 μs interval. Additionally, or alternatively, the central device and the peripheral devices may have an end of exchange 710 that is a time after the P2 Msg 708. This may be based at least in part on the communications being isochronous messages that are configured to be spaced apart (e.g., with equal spacing). Based at least in part on the end of exchange 710 timing being a first available time at which the central device could transmit another C Msg after the P2 Msg based at least in part on the isochronous nature of the communications, communications between the central device and the peripheral devices may have a delay to next communication 712. The next communication may be associated with a subsequent communication event. This may increase latency of communications between the central device and the peripheral devices.

Other configurations may be used, such as a single C Msg that polls a P1 Msg and a P2 Msg. However, timing to fit within the 1000 μs limit may restrict an amount of traffic that can be communicated during the communication interval.

As indicated above, FIG. 7 is provided as an example. Other examples may differ from what is described with regard to FIG. 7.

In some networks, the central device and the peripheral devices may use a communication interval, such as the communication interval shown in example 700. The peripheral devices may attempt to synchronization with the central device to allow for communication of uplink and/or downlink communication. However, a synchronization process may have similar timing issues, as shown in FIG. 7. For example, an exchange of synchronization information may exceed the 1000 μs limit and/or may cause the communication device and the peripheral device to delay a subsequent communication. Additionally, or alternatively, if the synchronization is delayed based at least in part on exceeding the 1000 μs limit, and the synchronization is unsuccessful, communication of data may be further delayed until a successful synchronization. In this way, a synchronization process may consume 2 times a number of communication intervals that may be consumed if the synchronization processes satisfied the 1000 μs limit. This 2× delay for synchronization may increase communication errors, cause increased latency, and/or disrupt a data stream between the central device and the peripheral devices.

In some aspects described herein, resources of a communication interval may be configured to support communications between a central device (e.g., an XR device) and multiple peripheral devices (e.g., XR peripheral devices) within a communication interval (e.g., with a 1000 μs limit). For example, the central device may transmit a first communication to initiate a first communication event. During the first communication event, the central device may transmit a first synchronization message during a first time resource that is associated with a first peripheral device, and the central device may transmit a second synchronization message during a second time resource that is associated with a second peripheral device. After the first communication event, the central device may transmit a second communication to initiate a second communication event. During the second communication event, the central device may monitor for a first response from the first peripheral device during a third time resource associated with the first time resource and monitor for a second response from the second peripheral device during a fourth time resource associated with the second time resource.

Based at least in part on receiving the first response and the second response, the central device may synchronize with the first peripheral device and the second peripheral device.

Based at least in part on failing to receive the first response or the second response, the central device may attempt again to synchronize with the first peripheral device and the second peripheral device. For example, based at least in part on failing to receive the first response, the central device may transmit a third communication to initiate a third communication event and transmit the first synchronization message (e.g., a retransmission of the first synchronization message associated with the first peripheral device) during a fifth time resource associated with the third communication event. The central device may also transmit a fourth communication to initiate a fourth communication event and monitor for a third response from the first peripheral device during a sixth time resource (e.g., within the fourth communication event) associated with the fifth time resource.

In another example, the central device may receive the first response from the first peripheral device during the third time resource and may fail to receive the second response from the second peripheral device during the fourth time resource. The central device may transmit, based at least in part on failing to receive the second response, a third communication to initiate a third communication event. During the third communication event, the central device may transmit the second synchronization message (e.g., a retransmission of the second synchronization message associated with the second peripheral device) during a fifth time resource associated with the third communication event. The central device may transmit a fourth communication to initiate a fourth communication event and monitor for a third response from the second peripheral device during a sixth time resource associated with the fifth time resource, with the sixth time resource associated with the fourth communication event. During the second attempt to synchronization with the second peripheral device, the central device may communicate, based at least in part on receiving the first response, with the first peripheral device during a seventh time resource associated with the third communication event. Additionally, or alternatively, the central device may communicate with the first peripheral device during an eighth time resource associated with the fourth communication event. In this way, the central device may communicate (e.g., exchange data and/or control information) during communication events that are also used to establish synchronization with the second peripheral device.

In an example process, the first peripheral device and the second peripheral device are both in an unsynchronized sub-state, and the central device is looking for both peripheral devices. The central device may alternate between events by transmitting synchronization packets and listening for packets from the peripheral devices. An event with a synchronization packet in both peripheral subevents (e.g., a first resource associated with communications to or from the first peripheral device and a second resource associated with communications to or from the second peripheral device) may always be followed by an event where the central device listens for a peripheral packet in both of the peripheral subevents.

In an example where the first peripheral device is in a synchronized sub-state, the central device may actively receive packets from the first peripheral device and may alternate between sending a synchronization packet in the subevent associated with the second peripheral device (e.g., a P2 slot) and listening in the P2 slot for packets from the second peripheral device.

In an example where the second peripheral device is in a synchronized sub-state, the central device may actively receive packets from the second peripheral device and may alternate between sending a synchronization packet in the subevent associated with the first peripheral device (e.g., a P1 slot) and listening in the P1 slot for packets from the first peripheral device.

In an example where the first peripheral device and the second peripheral device are in a synchronized sub-state, the central device may actively receive packets from the first peripheral device and the second peripheral device.

In the scanning state of a peripheral device, a peripheral device may attempt to synchronize on previously configured central device synchronization packets. For example, the peripheral device may set a scan channel set to all channels (e.g., 37 channels). Optionally, the peripheral device may perform bad channel assessment to determine potentially good channels to scan on to reduce the scan channel set. The peripheral device may listen for packets within the scan channel set with an access address of synchronization packets (AASync) for a duration (e.g., in milliseconds (ms)) of a synchronization window (TSync_Window) every interval (e.g., in ms) of the synchronization window (TSync_Interval). Each window may use a different channel within the scan channel set. Once a synchronization packet is detected by the peripheral device, the peripheral device may decode the payload of the synchronization packet (e.g., of a synchronization message from the central device) to determine the necessary timing and frequency hopping information to synchronize with the central device to receive a next central device packet. If the peripheral device fails to receive a synchronization packet within TSync_Timeout seconds, the peripheral device may again listen for packets within the scan channel set. The peripheral device may repeat the process until expiration of TSync_Giveup.

As indicated above, FIG. 7 is provided as an example. Other examples may differ from what is described with regard to FIG. 7.

Figure 8:
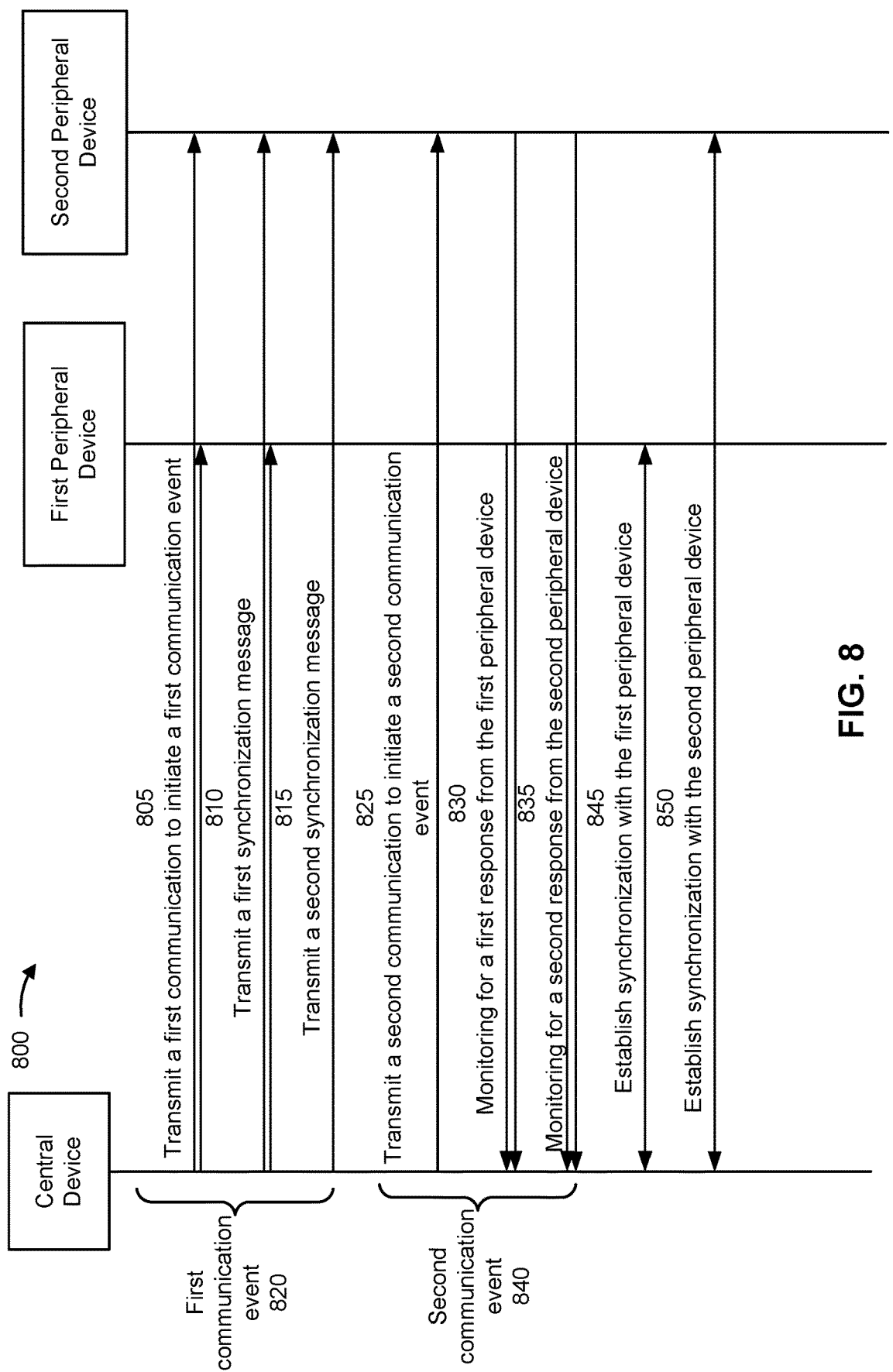
FIGS. 8-9 are diagrams illustrating examples associated with event-based initiation of a more data mode for a WPAN LE connection, in accordance with the present disclosure.

FIG. 8 is a diagram of an example 800 associated with synchronization messages for peripheral devices, in accordance with the present disclosure. As shown in FIG. 8, a central device (e.g., a mobile computing device, an XR device, and/or a video device) may communicate with a first peripheral device and a second peripheral device (e.g., a first XR controller or other input device and a second XR controller or other input device). In some aspects, the central device, the first peripheral device, and the second peripheral device may be part of a wireless network (e.g., a WPAN 100).

As shown by reference number 805, the central device may transmit, and the first peripheral device and/or the second peripheral device may receive, a first communication to initiate a first communication event. In some aspects, the first communication may include an allocation of resources for one or more synchronization messages.

A communication event may be a set of one or more communications that occur within a communication interval (e.g., a 1000 μs interval). The communication event may be initiated with a communication from the central device (e.g., the C Msg 702) and/or may be periodic.

As shown by reference number 810, the central device may transmit, and the first peripheral device and/or the second peripheral device may receive, a first synchronization message. For example, the central device may transmit the first synchronization message during a first time resource associated with the first communication event. The first time resource may be associated with a first peripheral device. For example, the first time resource may be allocated for communications between the central device and the first peripheral device. The first time resource may be a recurring time resource that is positioned within a set time period of communication intervals between the first peripheral device and the central device. In some aspects, the first peripheral device and/or the second peripheral device may receive the first synchronization message.

As shown by reference number 815, the central device may transmit, and the first peripheral device and/or the second peripheral device may receive, a second synchronization message. For example, the central device may transmit the second synchronization message during a second time resource associated with the second communication event. The second time resource may be associated with a second peripheral device. For example, the second time resource may be allocated for communications between the central device and the second peripheral device. The second time resource may be a recurring time resource that is positioned within a set time period of communication intervals between the second peripheral device and the central device. In some aspects, the first peripheral device and/or the second peripheral device may receive the second synchronization message.

In some aspects, the first synchronization message or the second synchronization message may include indications of a first offset associated with a time between a start of the first synchronization message and a start of the second communication, a second offset associated with a time between a start of the second communication and the third time resource, and/or a third offset associated with a time between a start of the second communication and the fourth time resource, among other examples. For example, the first synchronization message may include information for the first peripheral device and/or the second peripheral device to obtain timing and/or frequency synchronization with the central device. Based at least in part on obtaining timing and/or frequency synchronization with the central device, the first peripheral device and/or the second peripheral device may transmit a reply to and/or receive subsequent communications from the central device.

Transmission of the first communication, the first synchronization message, and the second synchronization message may be part of (e.g., included within a communication interval associated with) a first communication event 820.

As shown by reference number 825, the central device may transmit, and the first peripheral device and/or the second peripheral device may receive, a first communication to initiate a first communication event.

As shown by reference number 830, the central device may monitor for a first response from the first peripheral device. For example, the central device may monitor for the first response from the first peripheral device during a third time resource associated with the first time resource. The third time resource may be associated with the second communication event. In some aspects, the central device may receive the first response from the first peripheral device. Additionally, or alternatively, the central device may receive a second response from the second peripheral device during the third time resource.

In some aspects, the third time resource may be associated with the first time resource based at least in part on being positioned during a same, or overlapping, time window of communication events. For example, the first communication resource may be positioned with an offset from a reference time of the first communication event 820 (e.g., a start or end of the first communication event, or the first communication), and the third communication resource may be positioned with the same offset from a reference time of the second communication event (e.g., a start or end of the second communication event, or the second communication).

As shown by reference number 835, the central device may monitor for a second response from the second peripheral device. For example, the central device may monitor for the second response from the second peripheral device during a fourth time resource associated with the second time resource. The fourth time resource may be associated with the second communication event. Additionally, or alternatively, the central device may receive the first response from the first peripheral device during the fourth time resource.

In some aspects, the fourth time resource may be associated with the second time resource based at least in part on being positioned during a same, or overlapping, time window of communication events. For example, the second communication resource may be positioned with an offset from a reference time of the first communication event 820 (e.g., a start or end of the first communication event, or the first communication), and the fourth communication resource may be positioned with the same offset from a reference time of the second communication event (e.g., a start or end of the second communication event, or the second communication).

In some aspects, the first communication, the second communication, the first response, or the second response include a first portion of a payload that includes data, and a second portion of the payload that includes control information. In some aspects, the control information may be configured to be repeated if not acknowledged. For example, the control information may be configured to be repeated until acknowledged or until the control information expires.

In some aspects, the control information includes a sequence number associated with the control information or the data, a next expected sequence number associated with the first peripheral device, and/or a next expected sequence number associated with the second peripheral device, among other examples.

In some aspects, the data may include XR data, positioning information, power status information, gyroscope data, haptic data, and/or received input data, among other examples.

In some aspects, the communications and messages may be configured as isochronous communications in which spacing between subsequent messages, and/or time resources associated with the subsequent messages, is equal.

In some aspects, an amount of time between the first time resource and the first communication may be a same amount of time as an amount of time between the third time resource and the second communication. In some aspects, an amount of time between the first time resource and an end time of the first communication event may be a same amount of time as an amount of time between the third time resource and an end time of the second communication event.

In some aspects, an amount of time between the second time resource and the first communication may be a same amount of time as an amount of time between the fourth time resource and the second communication. In some aspects, an amount of time between the second time resource and an end time of the first communication event may be a same amount of time as an amount of time between the third time resource and an end time of the second communication event Transmission of the first communication, the first synchronization message, and the second synchronization message may be part of (e.g., included within a communication interval associated with) a first communication event 840.

In some aspects, the central device may fail to receive the first response or the second response and may repeat operation 810 and operation 825 during subsequent communication intervals, and/or may repeat operation 815 and operation 830 during subsequent communication intervals.

For example, based at least in part on failing to receive the first response, the central device may transmit a third communication to initiate a third communication event. The central device may transmit the first synchronization message during a fifth time resource associated with the third communication event. The fifth time resource may be associated with the first peripheral device. The central device may transmit a fourth communication to initiate a fourth communication event, and monitor for a third response from the first peripheral device during a sixth time resource associated with the fifth time resource. The sixth time resource may be associated with the fourth communication event.

For example, the central device may receive the first response from the first peripheral device during the third time resource and may fail to receive the second response from the second peripheral device during the fourth time resource. The central device may transmit, based at least in part on failing to receive the second response, a third communication to initiate a third communication event.

During the third communication event, the central device may transmit the second synchronization message (e.g., a retransmission of the second synchronization message associated with the second peripheral device) during a fifth time resource associated with the third communication event. The central device may transmit a fourth communication to initiate a fourth communication event and monitor for a third response from the second peripheral device during a sixth time resource associated with the fifth time resource, with the sixth time resource associated with the fourth communication event. During the second attempt to synchronize with the second peripheral device, the central device may communicate, based at least in part on receiving the first response, with the first peripheral device during a seventh time resource associated with the third communication event. Additionally, or alternatively, the central device may communicate with the first peripheral device during an eighth time resource associated with the fourth communication event. In this way, the central device may communicate (e.g., exchange data and/or control information) during communication events that are also used to establish synchronization with the second peripheral device.

In some aspects, the central device may receive a response from the first peripheral device or the second peripheral device and may synchronize with one of the first peripheral device or the second peripheral device. Based at least in part on synchronizing with only one of the peripheral devices, the central device may communicate (e.g., data and/or control information) with the synchronized peripheral device and may attempt again synchronize with the unsynchronized peripheral device (e.g., both within a same communication interval).

As shown by reference number 845, the central device may establish synchronization with the first peripheral device. For example, the central device may establish synchronization with the first peripheral device based at least in part on receiving the first response from the first peripheral device during the third time resource.

As shown by reference number 850, the central device may establish synchronization with the second peripheral device. For example, the central device may establish synchronization with the second peripheral device based at least in part on receiving the second response from the first peripheral device during the fourth time resource.

In some aspects, based at least in part on receiving the first response and/or synchronizing with the first peripheral device, the central device may communicate with the first peripheral device in subsequent communication intervals (e.g., associated with subsequent communication events). In some aspects, based at least in part on receiving the second response and/or synchronizing with the second peripheral device, the central device may communicate with the second peripheral device in subsequent communication intervals (e.g., associated with subsequent communication events).

Based at least in part on the central device alternating communication intervals and/or communication events between transmitting a synchronization message and listening for a reply in a same set of resources allocated for communications with the first peripheral device or the second peripheral device, the central device may improve a latency of synchronization between the first peripheral device, the second peripheral device, and the central device. In this way, the central device may conserve network resources that may have otherwise been consumed to extend a synchronization procedure over additional time resources.

As indicated above, FIG. 8 is provided as an example. Other examples may differ from what is described with respect to FIG. 8.

Figure 9:
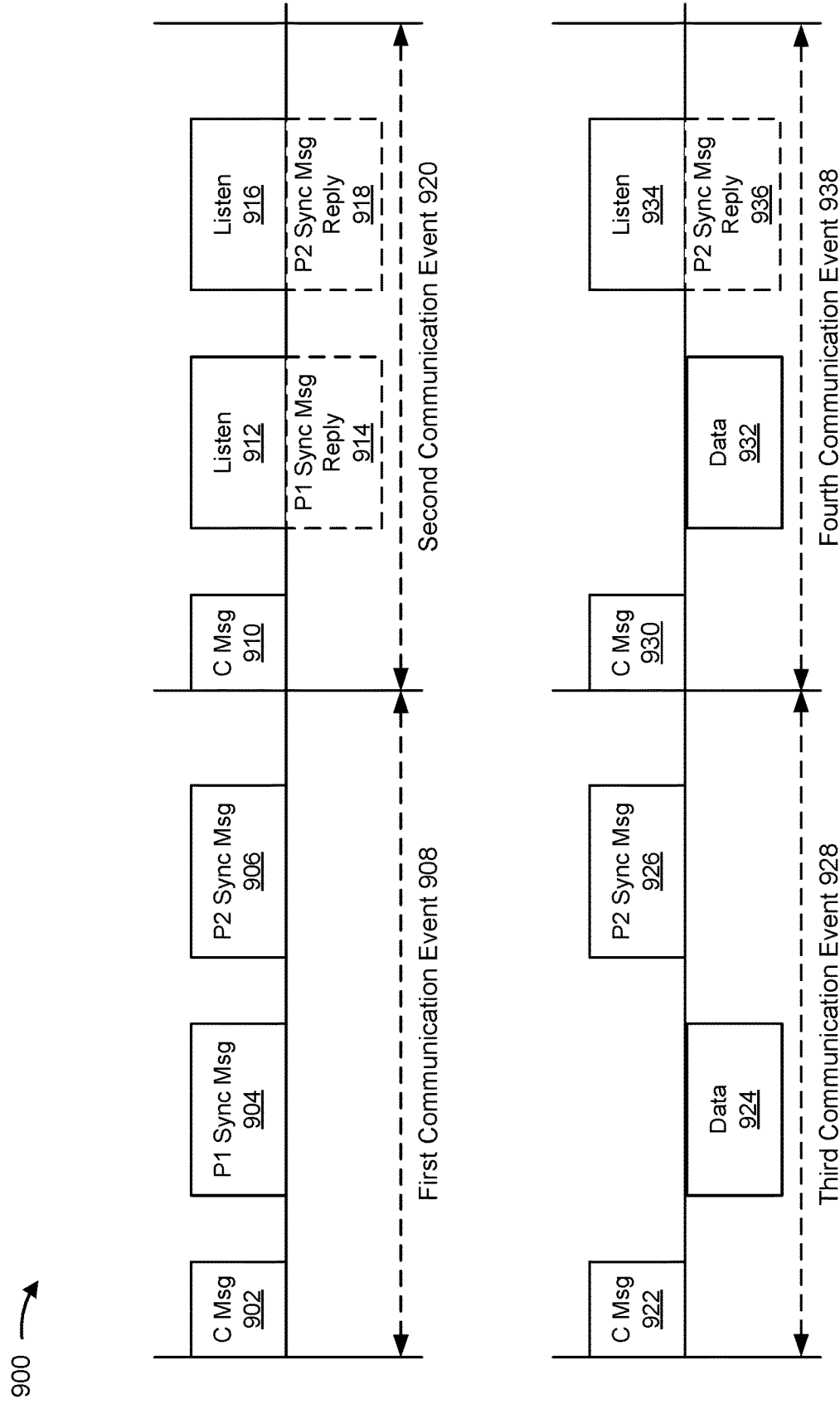

FIG. 9 is a diagram illustrating an example 900 of communication via an XR WPAN connection, in accordance with the present disclosure. In some examples, the XR WPAN connection may include a BLE connection and/or a modified BLE connection. For example, the XR WPAN connection may be configured to support multiple peripheral devices associated with a single application at a central device. The multiple peripheral devices may provide movement data (e.g., haptic data) and/or input data (e.g., input received at one or more buttons or joysticks of the multiple peripheral devices). The XR WPAN connection may be configured to modify a display associated with the central device based at least in part on the movement data and/or the input data.

In some networks, the XR WPAN connection may be associated with one or more constraints. For example, the XR WPAN connection may communicate with a 1000 µs interval. Additionally, or alternatively, the peripheral devices (e.g., XR controllers) may communicate with, for example, at least 29 octets from per interval. In some networks, the one or more constraints may be 900 µs communication intervals and at least 40 octets from each peripheral device per interval.

FIG. 9 shows an amount of time used to exchange packets between the central device and the peripheral devices within the 1000 µs interval. Timing for a central to peripheral packet may include either 0 or 10 octets and a peripheral to central packet of 30 octets. Additionally, TIFS and TMSS may be set to a standard value of 150 µs. Isochronous channel configurations may have a BN=1 (one packet per ISO interval), FT=1 (each packet flushed at the end of each interval), and NSE=1 (1 transmission opportunity per CIS per interval). Additionally, or alternatively, for the sequence to be viable, 150 µs after the second peripheral packet may be required to be available to change frequencies.

As shown in FIG. 9, the central device and the peripheral devices may use isochronous channels (e.g., with equal time intervals between communications) with each peripheral using a separate CIS. The central device may transmit a C Msg 902 during a first time resource at or around a beginning of a first communication interval (e.g., an event-based communication interval). The C Msg 902 may include an indication of resources allocated to subsequent communications (e.g., a poll message). The central device may transmit a first peripheral synchronization message (P1 Sync Msg) 904 during a second time resource of the communication interval (e.g., as indicated by the C Msg 902). The central device may transmit a second peripheral synchronization message (P2 Sync Msg) 906 during a third time resource of the first communication interval (e.g., as indicated by the C Msg 902).

In some aspects, the C Msg 902 may initiate a first communication event 908 that includes a communication interval during which one or more communications occur. For example, the first communication event 908 includes the C Msg 902, the P1 Sync Msg 904, and the P2 Sync Msg 906. The first communication event 908 may be initiated with the C Msg 902 transmitted from the central device. In some aspects, communication events may be periodic communication intervals during which one or more communications occur and/or have time resource allocated for communications (e.g., with a periodic start time and/or end time). For example, the first communication event 908 includes a first window of time (e.g., a first time resource) allocated for transmission of the C Msg 902, a second window of time (e.g., a second time resource) allocated for transmission of the P1 Sync Msg 904, and a third window of time (e.g., a third time resource) allocated for transmission of the P2 Sync Msg 906. Time resources may be paired with a frequency resource (e.g., a frequency bandwidth) for each of the transmissions.

The central device may transmit a C Msg 910 during a first time resource at or around a beginning of a second communication interval (e.g., an event-based communication interval). The C Msg 910 may include an indication of resources allocated to subsequent communications (e.g., a poll message). The central device may listen 912 for a reply to the P1 Sync Msg 904 (e.g., a P1 Sync Msg reply 914) during a second time resource of the second communication interval (e.g., as indicated by the C Msg 910). The second time resource of the second communication interval may correspond to the second time resource of the first communication interval. The central device may listen 916 for a reply to the P2 Sync Msg 906 (e.g., a P2 Sync Msg reply 918) during a third time resource of the second communication interval (e.g., as indicated by the C Msg 910). The third time resource of the second communication interval may correspond to the third time resource of the first communication interval.

In some aspects, the C Msg 910 may initiate a second communication event 920 that includes a communication interval during which one or more communications occur. For example, the second communication event 920 includes the C Msg 910 and, in some examples, P1 Sync Msg reply 914, and the P2 Sync Msg reply 918. The second communication event 920 may be initiated with the C Msg 910 transmitted from the central device. The second communication event 920 includes a first window of time (e.g., a first time resource) allocated for transmission of the C Msg 910, a second window of time (e.g., a second time resource) allocated for transmission of the P1 Sync Msg reply 914, and a third window of time (e.g., a third time resource) allocated for transmission of the P2 Sync Msg reply 918. Time resources may be paired with a frequency resource (e.g., a frequency bandwidth) for each of the transmissions.

The central device may transmit a C Msg 922 during a first time resource at or around a beginning of a third communication interval (e.g., an event-based communication interval). The C Msg 922 may include an indication of resources allocated to subsequent communications (e.g., a poll message). The central device may communicate data 924 with the first peripheral device (e.g., based at least in part on receiving the P1 Sync Msg reply 914) during a second time resource of the third communication interval. The central device may transmit a second peripheral synchronization message (P2 Sync Msg) 926 during a third time resource of the third communication interval (e.g., as indicated by the C Msg 902).

In some aspects, the C Msg 922 may initiate a third communication event 928 that includes a communication interval during which one or more communications occur. For example, the third communication event 928 includes the C Msg 922, the data 924, and the P2 Sync Msg 926. The third communication event may be initiated with the C Msg 922 transmitted from the central device. The third communication event 928 includes a first window of time (e.g., a first time resource) allocated for transmission of the C Msg 922, a second window of time (e.g., a second time resource) allocated for transmission of the data 924, and a third window of time (e.g., a third time resource) allocated for transmission of the P2 Sync Msg 926. Time resources may be paired with a frequency resource (e.g., a frequency bandwidth) for each of the transmissions.

The central device may transmit a C Msg 930 during a first time resource at or around a beginning of a fourth communication interval (e.g., an event-based communication interval). The C Msg 910 may include an indication of resources allocated to subsequent communications (e.g., a poll message). The central device may listen 912 for a reply to the P1 Sync Msg 904 (e.g., a P1 Sync Msg reply 914) during a second time resource of the second communication interval (e.g., as indicated by the C Msg 910). The second time resource of the second communication interval may correspond to the second time resource of the first communication interval. The central device may listen 916 for a reply to the P2 Sync Msg 906 (e.g., a P2 Sync Msg reply 918) during a third time resource of the second communication interval (e.g., as indicated by the C Msg 910). The second time resource of the second communication interval may correspond to the second time resource of the first communication interval and/or the second communication interval.

In some aspects, the C Msg 930 may initiate a fourth communication event 938 that includes a communication interval during which one or more communications occur. For example, the fourth communication event 938 includes the C Msg 930, the data 932, and may include the P2 Sync Msg reply 936. The fourth communication event 938 may be initiated with the C Msg 930 transmitted from the central device. The fourth communication event 938 includes a first window of time (e.g., a first time resource) allocated for transmission of the C Msg 930, a second window of time (e.g., a second time resource) allocated for transmission of the data 932, and a third window of time (e.g., a third time resource) allocated for transmission of the P2 Sync Msg reply 936. Time resources may be paired with a frequency resource (e.g., a frequency bandwidth) for each of the transmissions.

As indicated above, FIG. 9 is provided as an example. Other examples may differ from what is described with regard to FIG. 9.

Figure 10:
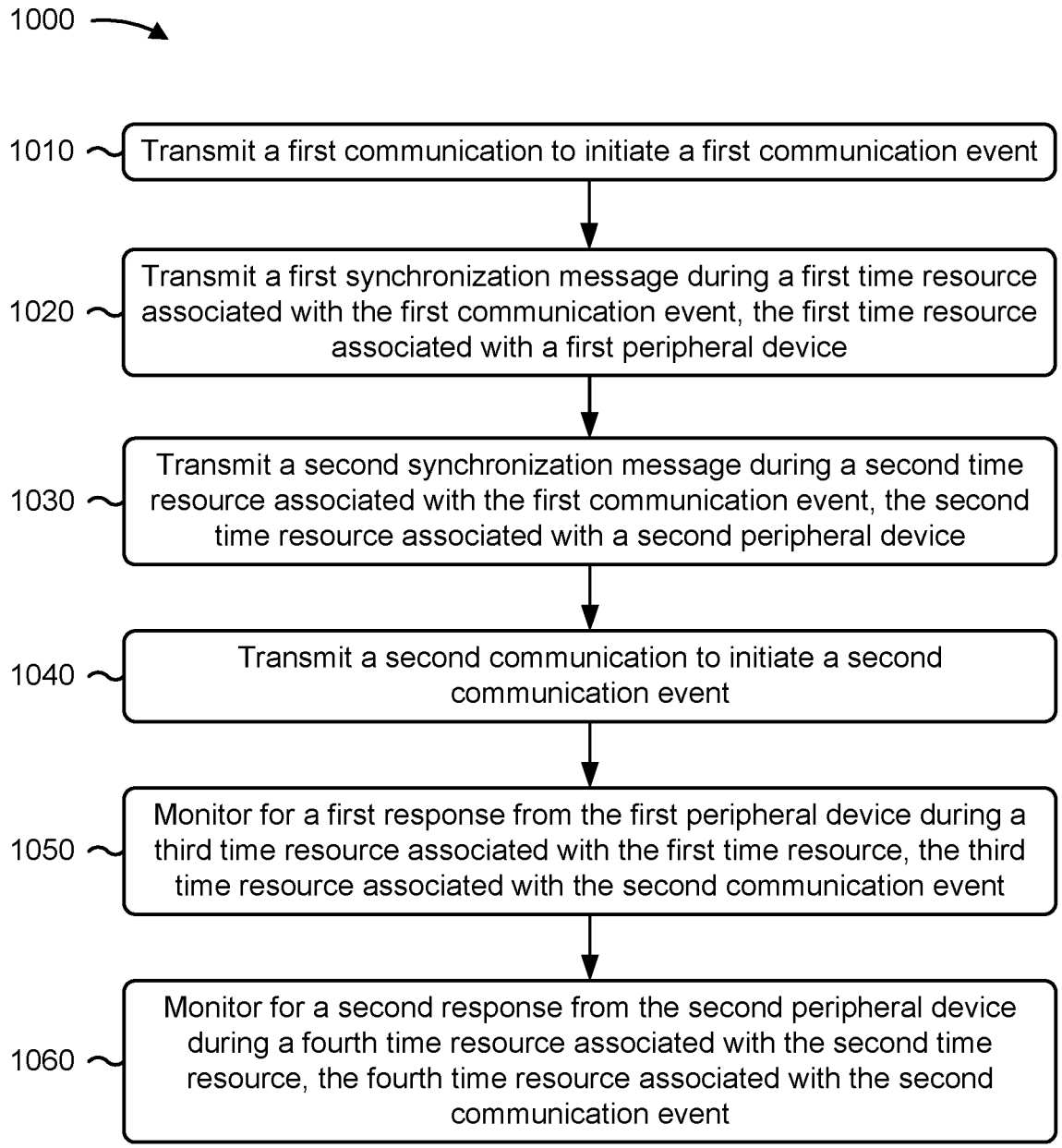
FIG. 10 is a diagram illustrating an example process associated with event-based initiation of a more data mode for a WPAN LE connection, in accordance with the present disclosure.

FIG. 10 is a diagram illustrating an example process 1000 performed, for example, by a central device, in accordance with the present disclosure. Example process 1000 is an example where the central device (e.g., central device 102, wireless communication device 200, and/or wireless communication device 410, among other examples) performs operations associated with synchronization messages for peripheral devices.

As shown in FIG. 10, in some aspects, process 1000 may include transmitting a first communication to initiate a first communication event (block 1010). For example, the central device (e.g., using a WPAN Controller 252, and/or a WWAN controller 256 and/or a transmission component 1104 and/or communication manager 1108, depicted in FIG. 11) may transmit a first communication to initiate a first communication event, as described above.

As further shown in FIG. 10, in some aspects, process 1000 may include transmitting a first synchronization message during a first time resource associated with the first communication event, the first time resource associated with a first peripheral device (block 1020). For example, the central device (e.g., using a WPAN Controller 252, and/or a WWAN controller 256 and/or a transmission component 1104 and/or communication manager 1108, depicted in FIG. 11) may transmit a first synchronization message during a first time resource associated with the first communication event, the first time resource associated with a first peripheral device, as described above.

As further shown in FIG. 10, in some aspects, process 1000 may include transmitting a second synchronization message during a second time resource associated with the first communication event, the second time resource associated with a second peripheral device (block 1030). For example, the central device (e.g., using a WPAN Controller 252, and/or a WWAN controller 256 and/or a transmission component 1104 and/or communication manager 1108, depicted in FIG. 11) may transmit a second synchronization message during a second time resource associated with the first communication event, the second time resource associated with a second peripheral device, as described above.

As further shown in FIG. 10, in some aspects, process 1000 may include transmitting a second communication to initiate a second communication event (block 1040). For example, the central device (e.g., using a WPAN Controller 252, and/or a WWAN controller 256 and/or a transmission component 1104 and/or communication manager 1108, depicted in FIG. 11) may transmit a second communication to initiate a second communication event, as described above.

As further shown in FIG. 10, in some aspects, process 1000 may include monitoring for a first response from the first peripheral device during a third time resource associated with the first time resource, the third time resource associated with the second communication event (block 1050). For example, the central device (e.g., using a WPAN Controller 252, and/or a WWAN controller 256 and/or a reception component 1102 and/or communication manager 1108, depicted in FIG. 11) may monitor for a first response from the first peripheral device during a third time resource associated with the first time resource, the third time resource associated with the second communication event, as described above.

As further shown in FIG. 10, in some aspects, process 1000 may include monitoring for a second response from the second peripheral device during a fourth time resource associated with the second time resource, the fourth time resource associated with the second communication event (block 1060). For example, the central device (e.g., using a WPAN Controller 252, and/or a WWAN controller 256 and/or a reception component 1102 and/or communication manager 1108, depicted in FIG. 11) may monitor for a second response from the second peripheral device during a fourth time resource associated with the second time resource, the fourth time resource associated with the second communication event, as described above.

Process 1000 may include additional aspects, such as any single aspect or any combination of aspects described below and/or in connection with one or more other processes described elsewhere herein.

In a first aspect, process 1000 includes establishing synchronization with the first peripheral device based at least in part on receiving the first response.

In a second aspect, alone or in combination with the first aspect, process 1000 includes failing to receive the first response, transmitting, based at least in part on failing to receive the first response, a third communication to initiate a third communication event, transmitting, based at least in part on failing to receive the first response, the first synchronization message during a fifth time resource associated with the third communication event, the fifth time resource associated with the first peripheral device, transmitting a fourth communication to initiate a fourth communication event, and monitoring for a third response from the first peripheral device during a sixth time resource associated with the fifth time resource, the sixth time resource associated with the fourth communication event.

In a third aspect, alone or in combination with one or more of the first and second aspects, process 1000 includes receiving the first response from the first peripheral device during the third time resource, failing to receive the second response from the second peripheral device during the fourth time resource, transmitting, based at least in part on failing to receive the second response, a third communication to initiate a third communication event, transmitting, based at least in part on failing to receive the second response, the second synchronization message during a fifth time resource associated with the third communication event, the fifth time resource associated with the second peripheral device, transmitting a fourth communication to initiate a fourth communication event, and monitoring for a third response from the second peripheral device during a sixth time resource associated with the fifth time resource, the sixth time resource associated with the fourth communication event.

In a fourth aspect, alone or in combination with one or more of the first through third aspects, process 1000 includes communicating, based at least in part on receiving the first response, with the first peripheral device during a seventh time resource associated with the third communication event, and communicating, based at least in part on receiving the first response, with the first peripheral device during an eighth time resource associated with the fourth communication event.

In a fifth aspect, alone or in combination with one or more of the first through fourth aspects, one or more of the first synchronization message or the second synchronization message comprise indications of one or more of a first offset associated with a time between a start of the first synchronization message and a start of the second communication, a second offset associated with a time between a start of the second communication and the third time resource, or a third offset associated with a time between a start of the second communication and the fourth time resource.

In a sixth aspect, alone or in combination with one or more of the first through fifth aspects, the first communication, the second communication, the first response, or the second response comprises a first portion of a payload that includes data, and a second portion of the payload that includes control information, the control information configured to be repeated if not acknowledged.

In a seventh aspect, alone or in combination with one or more of the first through sixth aspects, the data is associated with one or more of extending reality data, positioning information, power status information, data, haptic data, or receiving input data.

In an eighth aspect, alone or in combination with one or more of the first through seventh aspects, the control information comprises one or more of a sequence number associated with the control information or the data, a next expected sequence number associated with the first peripheral device, or a next expected sequence number associated with the second peripheral device.

In a ninth aspect, alone or in combination with one or more of the first through eighth aspects, an amount of time between the first time resource and the first communication is a same amount of time as an amount of time between the third time resource and the second communication, or wherein an amount of time between the first time resource and an end time of the first communication event is a same amount of time as an amount of time between the third time resource and an end time of the second communication event.

In a tenth aspect, alone or in combination with one or more of the first through ninth aspects, an amount of time between the second time resource and the first communication is a same amount of time as an amount of time between the fourth time resource and the second communication, or wherein an amount of time between the second time resource and an end time of the first communication event is a same amount of time as an amount of time between the third time resource and an end time of the second communication event.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
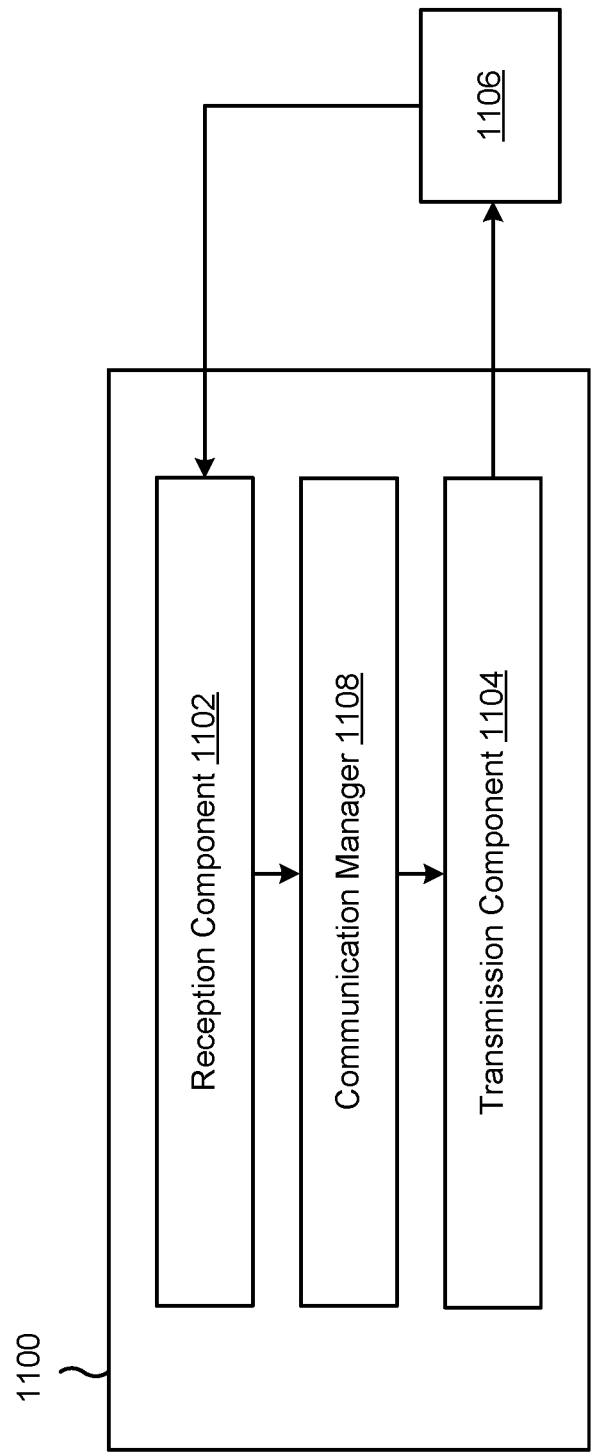
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a central device, or a central device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a peripheral device, an XR controller, or another wireless communication device) using the reception component 1102 and the transmission component 1104. As further shown, the apparatus 1100 may include a communication manager 1108. The communication manager 1108 may include the WWAN controller 256, the Bluetooth controller 252, the processor(s) 202, and/or the MMU 240.

In some aspects, the apparatus 1100 may be configured to perform one or more operations described herein in connection with FIGS. 8-9. Additionally, or alternatively, the apparatus 1100 may be configured to perform one or more processes described herein, such as process 1000 of FIG. 10. In some aspects, the apparatus 1100 and/or one or more components shown in FIG. 11 may include one or more components of the central device described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a multiple-input multiple-output (MIMO) detector, a receive processor, a controller/processor, a memory, or a combination thereof, of the central device described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the central device described in connection with FIG. 2. In some aspects, the transmission component 1104 may be co-located with the reception component 1102 in a transceiver.

The transmission component 1104 may transmit a first communication to initiate a first communication event. The transmission component 1104 may transmit a first synchronization message during a first time resource associated with the first communication event, the first time resource associated with a first peripheral device. The transmission component 1104 may transmit a second synchronization message during a second time resource associated with the first communication event, the second time resource associated with a second peripheral device. The transmission component 1104 may transmit a second communication to initiate a second communication event. The communication manager 1108 and/or reception component 1102 may monitor for a first response from the first peripheral device during a third time resource associated with the first time resource, the third time resource associated with the second communication event. The communication manager 1108 and/or reception component 1102 may monitor for a second response from the second peripheral device during a fourth time resource associated with the second time resource, the fourth time resource associated with the second communication event.

The communication manager 1108 may establish synchronization with the first peripheral device based at least in part on receiving the first response.

The communication manager 1108 and/or reception component 1102 may fail to receive the first response.

The transmission component 1104 may transmit, based at least in part on failing to receive the first response, a third communication to initiate a third communication event.

The transmission component 1104 may transmit, based at least in part on failing to receive the first response, the first synchronization message during a fifth time resource associated with the third communication event, the fifth time resource associated with the first peripheral device.

The transmission component 1104 may transmit a fourth communication to initiate a fourth communication event.

The communication manager 1108 and/or reception component 1102 may monitor for a third response from the first peripheral device during a sixth time resource associated with the fifth time resource, the sixth time resource associated with the fourth communication event.

The reception component 1102 may receive the first response from the first peripheral device during the third time resource.

The communication manager 1108 and/or reception component 1102 may fail to receive the second response from the second peripheral device during the fourth time resource.

The transmission component 1104 may transmit, based at least in part on failing to receive the second response, a third communication to initiate a third communication event.

The transmission component 1104 may transmit, based at least in part on failing to receive the second response, the second synchronization message during a fifth time resource associated with the third communication event, the fifth time resource associated with the second peripheral device.

The transmission component 1104 may transmit a fourth communication to initiate a fourth communication event.

The communication manager 1108 and/or reception component 1102 may monitor for a third response from the second peripheral device during a sixth time resource associated with the fifth time resource, the sixth time resource associated with the fourth communication event.

The communication manager 1108, transmission component 1104, and/or reception component 1102 may communicate, based at least in part on receiving the first response, with the first peripheral device during a seventh time resource associated with the third communication event.

The communication manager 1108, transmission component 1104, and/or reception component 1102 may communicate, based at least in part on receiving the first response, with the first peripheral device during an eighth time resource associated with the fourth communication event.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a central device, comprising: transmitting a first communication to initiate a first communication event; transmitting a first synchronization message during a first time resource associated with the first communication event, the first time resource associated with a first peripheral device; transmitting a second synchronization message during a second time resource associated with the first communication event, the second time resource associated with a second peripheral device; transmitting a second communication to initiate a second communication event; monitoring for a first response from the first peripheral device during a third time resource associated with the first time resource, the third time resource associated with the second communication event; and monitoring for a second response from the second peripheral device during a fourth time resource associated with the second time resource, the fourth time resource associated with the second communication event.

Aspect 2: The method of Aspect 1, further comprising: establish synchronization with the first peripheral device based at least in part on receiving the first response.

Aspect 3: The method of any of Aspects 1-2, further comprising: failing to receive the first response; transmitting, based at least in part on failing to receive the first response, a third communication to initiate a third communication event; transmitting, based at least in part on failing to receive the first response, the first synchronization message during a fifth time resource associated with the third communication event, the fifth time resource associated with the first peripheral device; transmitting a fourth communication to initiate a fourth communication event; and monitoring for a third response from the first peripheral device during a sixth time resource associated with the fifth time resource, the sixth time resource associated with the fourth communication event.

Aspect 4: The method of any of Aspects 1-3, further comprising: receiving the first response from the first peripheral device during the third time resource; failing to receive the second response from the second peripheral device during the fourth time resource; transmitting, based at least in part on failing to receive the second response, a third communication to initiate a third communication event; transmitting, based at least in part on failing to receive the second response, the second synchronization message during a fifth time resource associated with the third communication event, the fifth time resource associated with the second peripheral device; transmitting a fourth communication to initiate a fourth communication event; and monitoring for a third response from the second peripheral device during a sixth time resource associated with the fifth time resource, the sixth time resource associated with the fourth communication event.

Aspect 5: The method of Aspect 4, further comprising: communicating, based at least in part on receiving the first response, with the first peripheral device during a seventh time resource associated with the third communication event; and communicating, based at least in part on receiving the first response, with the first peripheral device during an eighth time resource associated with the fourth communication event.

Aspect 6: The method of any of Aspects 1-5, wherein one or more of the first synchronization message or the second synchronization message comprise indications of one or more of: a first offset associated with a time between a start of the first synchronization message and a start of the second communication, a second offset associated with a time between a start of the second communication and the third time resource, or a third offset associated with a time between a start of the second communication and the fourth time resource.

Aspect 7: The method of any of Aspects 1-6, wherein the first communication, the second communication, the first response, or the second response comprises: a first portion of a payload that includes data, and a second portion of the payload that includes control information, the control information configured to be repeated if not acknowledged.

Aspect 8: The method of Aspect 7, wherein the data is associated with one or more of: extended reality data, positioning information, power status information, gyroscope data, haptic data, or received input data.

Aspect 9: The method of any of Aspects 7-8, wherein the control information comprises one or more of: a sequence number associated with the control information or the data, a next expected sequence number associated with the first peripheral device, or a next expected sequence number associated with the second peripheral device.

Aspect 10: The method of any of Aspects 1-9, wherein an amount of time between the first time resource and the first communication is a same amount of time as an amount of time between the third time resource and the second communication, or wherein an amount of time between the first time resource and an end time of the first communication event is a same amount of time as an amount of time between the third time resource and an end time of the second communication event.

Aspect 11: The method of any of Aspects 1-10, wherein an amount of time between the second time resource and the first communication is a same amount of time as an amount of time between the fourth time resource and the second communication, or wherein an amount of time between the second time resource and an end time of the first communication event is a same amount of time as an amount of time between the third time resource and an end time of the second communication event.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A central device for wireless communication, comprising:
   a memory; and
   one or more processors, coupled to the memory, configured to:

transmit a first communication to initiate a first communication event;
transmit a first synchronization message during a first time resource associated with the first communication event, the first time resource associated with a first peripheral device;
transmit a second synchronization message during a second time resource associated with the first communication event, the second time resource associated with a second peripheral device;
transmit a second communication to initiate a second communication event;
monitor for a first response from the first peripheral device during a third time resource associated with the first time resource, the third time resource associated with the second communication event; and
monitor for a second response from the second peripheral device during a fourth time resource associated with the second time resource, the fourth time resource associated with the second communication event.

2. The central device of claim 1, wherein the one or more processors are further configured to:
establish synchronization with the first peripheral device based at least in part on receiving the first response.

3. The central device of claim 1, wherein the one or more processors, based at least in part on a failure to receive the first response, are further configured to:
transmit a third communication to initiate a third communication event;
transmit the first synchronization message during a fifth time resource associated with the third communication event, the fifth time resource associated with the first peripheral device;
transmit a fourth communication to initiate a fourth communication event; and
monitor for a third response from the first peripheral device during a sixth time resource associated with the fifth time resource, the sixth time resource associated with the fourth communication event.

4. The central device of claim 1, wherein the one or more processors, based at least in part on a failure to receive the second response, are further configured to:
transmit, based at least in part on failing to receive the second response, a third communication to initiate a third communication event;
transmit, based at least in part on failing to receive the second response, the second synchronization message during a fifth time resource associated with the third communication event, the fifth time resource associated with the second peripheral device;
transmit a fourth communication to initiate a fourth communication event; and
monitor for a third response from the second peripheral device during a sixth time resource associated with the fifth time resource, the sixth time resource associated with the fourth communication event.

5. The central device of claim 4, wherein the one or more processors, based at least in part on reception of the first response, are further configured to:
communicate, based at least in part on receiving the first response, with the first peripheral device during a seventh time resource associated with the third communication event; and communicate, based at least in part on receiving the first response, with the first peripheral device during an eighth time resource associated with the fourth communication event.

6. The central device of claim 1, wherein one or more of the first synchronization message or the second synchronization message comprise indications of one or more of:
a first offset associated with a time between a start of the first synchronization message and a start of the second communication,
a second offset associated with a time between a start of the second communication and the third time resource, or
a third offset associated with a time between a start of the second communication and the fourth time resource.

7. The central device of claim 1, wherein the first communication, the second communication, the first response, or the second response comprises:
a first portion of a payload that includes data, and
a second portion of the payload that includes control information, the control information configured to be repeated if not acknowledged.

8. The central device of claim 7, wherein the data is associated with one or more of:
extended reality data,
positioning information,
power status information,
gyroscope data,
haptic data, or
received input data.

9. The central device of claim 7, wherein the control information comprises one or more of:
a sequence number associated with the control information or the data,
a next expected sequence number associated with the first peripheral device, or
a next expected sequence number associated with the second peripheral device.

10. The central device of claim 1, wherein an amount of time between the first time resource and the first communication is a same amount of time as an amount of time between the third time resource and the second communication, or
wherein an amount of time between the first time resource and an end time of the first communication event is a same amount of time as an amount of time between the third time resource and an end time of the second communication event.

11. The central device of claim 1, wherein an amount of time between the second time resource and the first communication is a same amount of time as an amount of time between the fourth time resource and the second communication, or
wherein an amount of time between the second time resource and an end time of the first communication event is a same amount of time as an amount of time between the third time resource and an end time of the second communication event.

12. A method of wireless communication performed by a central device, comprising:
transmitting a first communication to initiate a first communication event;
transmitting a first synchronization message during a first time resource associated with the first communication event, the first time resource associated with a first peripheral device;

transmitting a second synchronization message during a second time resource associated with the first communication event, the second time resource associated with a second peripheral device;

transmitting a second communication to initiate a second communication event;

monitoring for a first response from the first peripheral device during a third time resource associated with the first time resource, the third time resource associated with the second communication event; and monitoring for a second response from the second peripheral device during a fourth time resource associated with the second time resource, the fourth time resource associated with the second communication event.

13. The method of claim 12, further comprising:

establishing synchronization with the first peripheral device based at least in part on receiving the first response.

14. The method of claim 12, further comprising:

failing to receive the first response;

transmitting, based at least in part on failing to receive the first response, a third communication to initiate a third communication event;

transmitting, based at least in part on failing to receive the first response, the first synchronization message during a fifth time resource associated with the third communication event, the fifth time resource associated with the first peripheral device;

transmitting a fourth communication to initiate a fourth communication event; and monitoring for a third response from the first peripheral device during a sixth time resource associated with the fifth time resource, the sixth time resource associated with the fourth communication event.

15. The method of claim 12, further comprising:

receiving the first response from the first peripheral device during the third time resource;

failing to receive the second response from the second peripheral device during the fourth time resource;

transmitting, based at least in part on failing to receive the second response, a third communication to initiate a third communication event;

transmitting, based at least in part on failing to receive the second response, the second synchronization message during a fifth time resource associated with the third communication event, the fifth time resource associated with the second peripheral device;

transmitting a fourth communication to initiate a fourth communication event; and monitoring for a third response from the second peripheral device during a sixth time resource associated with the fifth time resource, the sixth time resource associated with the fourth communication event.

16. The method of claim 15, further comprising:

communicating, based at least in part on receiving the first response, with the first peripheral device during a seventh time resource associated with the third communication event; and communicating, based at least in part on receiving the first response, with the first peripheral device during an eighth time resource associated with the fourth communication event.

17. The method of claim 12, wherein one or more of the first synchronization message or the second synchronization message comprise indications of one or more of:

a first offset associated with a time between a start of the first synchronization message and a start of the second communication, a second offset associated with a time between a start of the second communication and the third time resource, or a third offset associated with a time between a start of the second communication and the fourth time resource.

18. The method of claim 12, wherein the first communication, the second communication, the first response, or the second response comprises:

a first portion of a payload that includes data, and a second portion of the payload that includes control information, the control information configured to be repeated if not acknowledged.

19. The method of claim 18, wherein the data is associated with one or more of:

extended reality data, positioning information, power status information, gyroscope data, haptic data, or received input data.

20. The method of claim 18, wherein the control information comprises one or more of:

a sequence number associated with the control information or the data, a next expected sequence number associated with the first peripheral device, or a next expected sequence number associated with the second peripheral device.

21. The method of claim 12, wherein an amount of time between the first time resource and the first communication is a same amount of time as an amount of time between the third time resource and the second communication, or wherein an amount of time between the first time resource and an end time of the first communication event is a same amount of time as an amount of time between the third time resource and an end time of the second communication event.

22. The method of claim 12, wherein an amount of time between the second time resource and the first communication is a same amount of time as an amount of time between the fourth time resource and the second communication, or wherein an amount of time between the second time resource and an end time of the first communication event is a same amount of time as an amount of time between the third time resource and an end time of the second communication event.

23. A non-transitory computer-readable medium storing a set of instructions for wireless communication, the set of instructions comprising:

one or more instructions that, when executed by one or more processors of a central device, cause the central device to:

transmit a first communication to initiate a first communication event;

transmit a first synchronization message during a first time resource associated with the first communication event, the first time resource associated with a first peripheral device;

transmit a second synchronization message during a second time resource associated with the first communication event, the second time resource associated with a second peripheral device;

transmit a second communication to initiate a second communication event;

monitor for a first response from the first peripheral device during a third time resource associated with the first time resource, the third time resource associated with the second communication event; and monitor for a second response from the second peripheral device during a fourth time resource associated with the second time resource, the fourth time resource associated with the second communication event.

24. The non-transitory computer-readable medium of claim 23, wherein the one or more instructions further cause the central device to:

establish synchronization with the first peripheral device based at least in part on receiving the first response.

25. The non-transitory computer-readable medium of claim 23, wherein the one or more instructions further cause the central device to:

transmit, based at least in part on a failure to receive the first response, a third communication to initiate a third communication event;

transmit, based at least in part on a failure to receive the first response, the first synchronization message during a fifth time resource associated with the third communication event, the fifth time resource associated with the first peripheral device;

transmit a fourth communication to initiate a fourth communication event; and monitor for a third response from the first peripheral device during a sixth time resource associated with the fifth time resource, the sixth time resource associated with the fourth communication event.

26. The non-transitory computer-readable medium of claim 23, wherein the one or more instructions further cause the central device to:

receive the first response from the first peripheral device during the third time resource;

transmit, based at least in part on a failure to receive the second response, a third communication to initiate a third communication event;

transmit, based at least in part on a failure to receive the second response, the second synchronization message during a fifth time resource associated with the third communication event, the fifth time resource associated with the second peripheral device;

transmit a fourth communication to initiate a fourth communication event; and monitor for a third response from the second peripheral device during a sixth time resource associated with the fifth time resource, the sixth time resource associated with the fourth communication event.

27. An apparatus for wireless communication, comprising:

means for transmitting a first communication to initiate a first communication event;

means for transmitting a first synchronization message during a first time resource associated with the first communication event, the first time resource associated with a first peripheral device;

means for transmitting a second synchronization message during a second time resource associated with the first communication event, the second time resource associated with a second peripheral device;

means for transmitting a second communication to initiate a second communication event;

means for monitoring for a first response from the first peripheral device during a third time resource associated with the first time resource, the third time resource associated with the second communication event; and means for monitoring for a second response from the second peripheral device during a fourth time resource associated with the second time resource, the fourth time resource associated with the second communication event.

28. The apparatus of claim 27, further comprising:

means for establishing synchronization with the first peripheral device based at least in part on receiving the first response.

29. The apparatus of claim 27, further comprising:

means for failing to receive the first response;

means for transmitting, based at least in part on failing to receive the first response, a third communication to initiate a third communication event;

means for transmitting, based at least in part on failing to receive the first response, the first synchronization message during a fifth time resource associated with the third communication event, the fifth time resource associated with the first peripheral device;

means for transmitting a fourth communication to initiate a fourth communication event; and means for monitoring for a third response from the first peripheral device during a sixth time resource associated with the fifth time resource, the sixth time resource associated with the fourth communication event.

30. The apparatus of claim 27, further comprising:

means for receiving the first response from the first peripheral device during the third time resource;

means for failing to receive the second response from the second peripheral device during the fourth time resource;

means for transmitting, based at least in part on failing to receive the second response, a third communication to initiate a third communication event;

means for transmitting, based at least in part on failing to receive the second response, the second synchronization message during a fifth time resource associated with the third communication event, the fifth time resource associated with the second peripheral device;

means for transmitting a fourth communication to initiate a fourth communication event; and means for monitoring for a third response from the second peripheral device during a sixth time resource associated with the fifth time resource, the sixth time resource associated with the fourth communication event.

* * * * *